United States Patent
Noumura et al.

(10) Patent No.: US 8,775,040 B2
(45) Date of Patent: Jul. 8, 2014

(54) VEHICLE CONTROL SYSTEM

(75) Inventors: Shin Noumura, Susono (JP); Ken Koibuchi, Hadano (JP); Keisuke Takeuchi, Susono (JP); Toshio Tanahashi, Susono (JP); Hiroyuki Hanamura, Gotenba (JP); Yoji Takanami, Anjyo (JP); Norimi Asahara, Numadu (JP); Kaiji Itabashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 372 days.

(21) Appl. No.: 13/389,829

(22) PCT Filed: Aug. 17, 2010

(86) PCT No.: PCT/IB2010/002021
§ 371 (c)(1),
(2), (4) Date: Feb. 10, 2012

(87) PCT Pub. No.: WO2011/021088
PCT Pub. Date: Feb. 24, 2011

(65) Prior Publication Data
US 2012/0143399 A1 Jun. 7, 2012

(30) Foreign Application Priority Data

Aug. 18, 2009 (JP) ................. 2009-189499
Mar. 12, 2010 (JP) ................. 2010-056597
Mar. 12, 2010 (JP) ................. 2010-056599

(51) Int. Cl.
*G06F 7/00* (2006.01)
*G06F 17/00* (2006.01)
*G06F 19/00* (2011.01)

(52) U.S. Cl.
USPC ............... 701/55; 701/57; 701/68; 701/73; 701/74; 701/37; 136/256; 303/148; 303/149; 303/150; 303/151

(58) Field of Classification Search
USPC ............. 701/55, 57, 68, 73, 74, 37; 136/256; 303/148–151
See application file for complete search history.

(56) References Cited

U.S. PATENT DOCUMENTS 5,272,428 A * 12/1993 Spiegel et al. ................ 318/803
5,483,446 A * 1/1996 Momose et al. ................ 701/1

(Continued)

FOREIGN PATENT DOCUMENTS

EP 1 967 432 A1 9/2008
JP A-06-249007 9/1994

(Continued)

OTHER PUBLICATIONS

A recursive multi-scale correlation-averaging algorithm for synchronization and fusion of independent pavement roughness measurements; Ndoye, M. ; Barker, A.M. ; Krogmeier, J.V. ; Bullock, D.M.;Intelligent Transportation Systems, 2009. ITSC '09. 12th Inter IEEE Conf on; Digital Object Id: 10.1109/ITSC.2009.5309749 ; Pub. Year: 2009 pp. 1-6.*

(Continued)

*Primary Examiner* — Cuong H Nguyen
(74) *Attorney, Agent, or Firm* — Oliff PLC

(57) ABSTRACT

A vehicle control system obtains an index indicating a running condition of a vehicle on the basis of a vehicle parameter indicating a motion of the vehicle and then sets a running characteristic of the vehicle in accordance with the index. The vehicle control system includes a noise reduction unit that is configured to obtain the index on the basis of the vehicle parameter of which a fluctuating component that fluctuates because of a driver's driving operation or the influence of a running road surface.

8 Claims, 15 Drawing Sheets

(56) References Cited

U.S. PATENT DOCUMENTS

| | | | |
|---|---|---|---|
| 5,532,929 A * | 7/1996 | Hattori et al. | 701/110 |
| 5,566,072 A * | 10/1996 | Momose et al. | 701/117 |
| 5,895,435 A * | 4/1999 | Ohta et al. | 701/59 |
| 6,417,784 B1 * | 7/2002 | Hilliard et al. | 340/941 |
| 6,611,210 B2 * | 8/2003 | Hilliard et al. | 340/941 |
| 6,882,919 B2 * | 4/2005 | Lee et al. | 701/59 |
| 7,263,419 B2 * | 8/2007 | Wheals et al. | 701/36 |
| 8,442,720 B2 * | 5/2013 | Lu et al. | 701/38 |
| 8,473,154 B2 * | 6/2013 | Noumura et al. | 701/37 |
| 8,521,338 B2 * | 8/2013 | Takeuchi et al. | 701/1 |
| 2002/0154032 A1 * | 10/2002 | Hilliard et al. | 340/933 |
| 2008/0097674 A1 | 4/2008 | Kuwahara et al. | |
| 2009/0043474 A1 | 2/2009 | Nakai et al. | |
| 2009/0107747 A1 | 4/2009 | Luehrsen et al. | |

FOREIGN PATENT DOCUMENTS

| | | | |
|---|---|---|---|
| JP | A-7-179169 | | 7/1995 |
| JP | A-08-028640 | | 2/1996 |
| JP | A-10-077894 | | 3/1998 |
| JP | 2005-132186 A | | 5/2005 |
| JP | A-2008-101742 | | 5/2008 |
| JP | 2009-040305 A | | 2/2009 |
| JP | 2010-192524 | * | 8/2010 |
| WO | WO 2011/021084 A2 | | 2/2011 |
| WO | WO 2011/021090 A2 | | 2/2011 |
| WO | WO 2011/021634 A1 | | 2/2011 |

OTHER PUBLICATIONS

Curb Detection Based on a Multi-Frame Persistence Map for Urban Driving Scenarios; Oniga, F. ; Nedevschi, S. ; Meinecke, M.M; Intelligent Transportation Systems, 2008. ITSC 2008. 11th International IEEE Conference on ;Digital Object Identifier: 10.1109/ITSC.2008.4732706 ; Publication Year: 2008 , pp. 67-72.*

Active front steering system using adaptive sliding mode control; Truong, D.V.T. ; Tomaske, W.; Control and Decision Conference (CCDC), 2013 25th Chinese; Digital Object Identifier: 10.1109/CCDC.2013.6560930; Publication Year: 2013 , pp. 253-258.*

International Search Report issued in International Application No. PCT/IB2010/002021 dated Nov. 12, 2010.

Written Opinion of the International Searching Authority issued in International Application No. PCT/IB2010/002021 dated Nov. 12, 2010.

* cited by examiner

F I G . 2
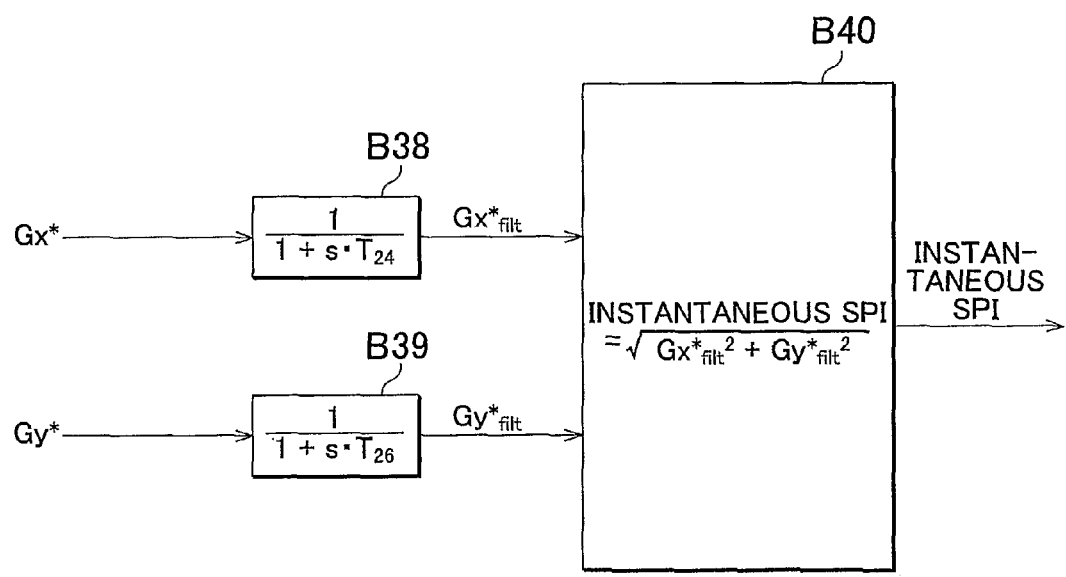

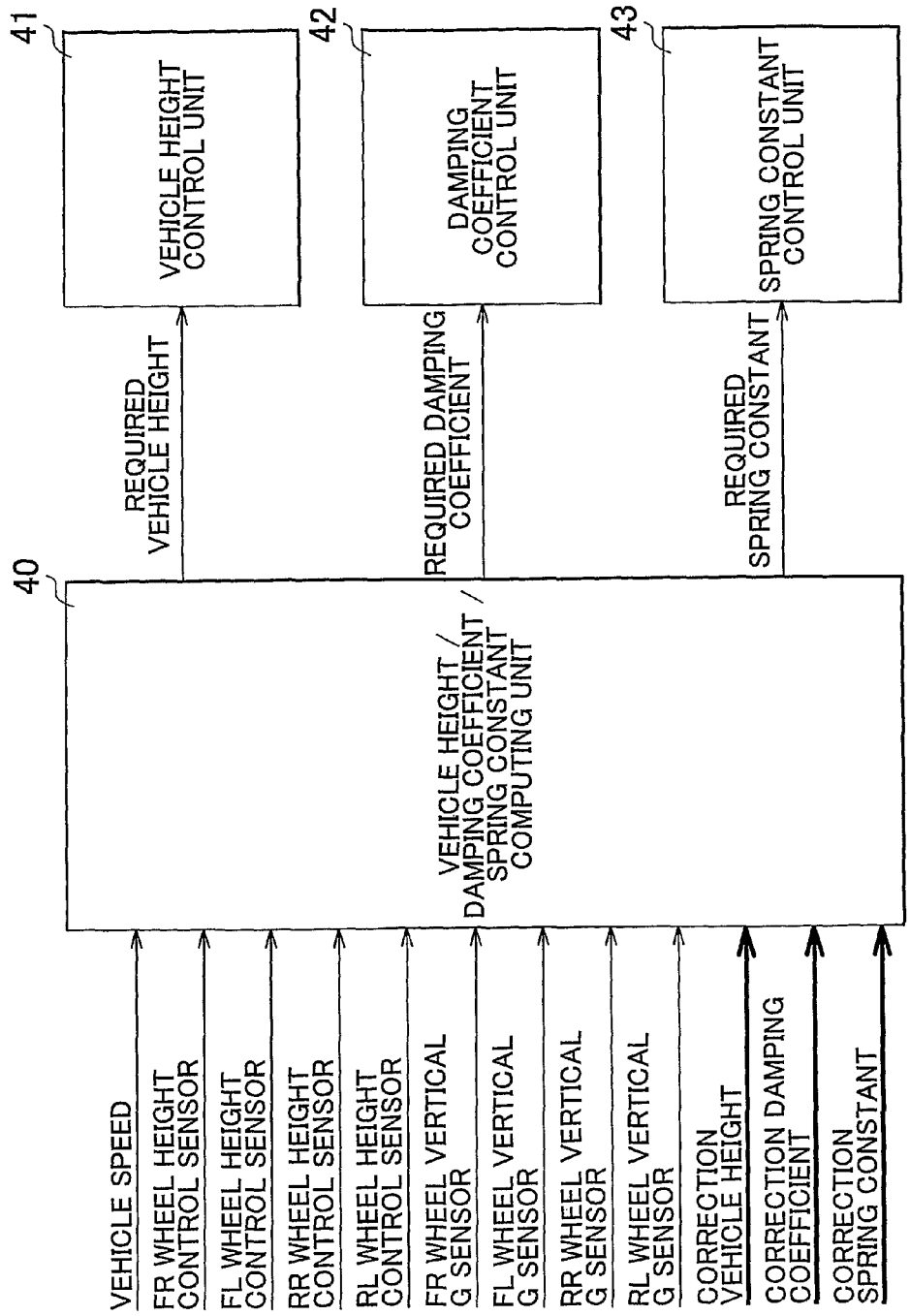

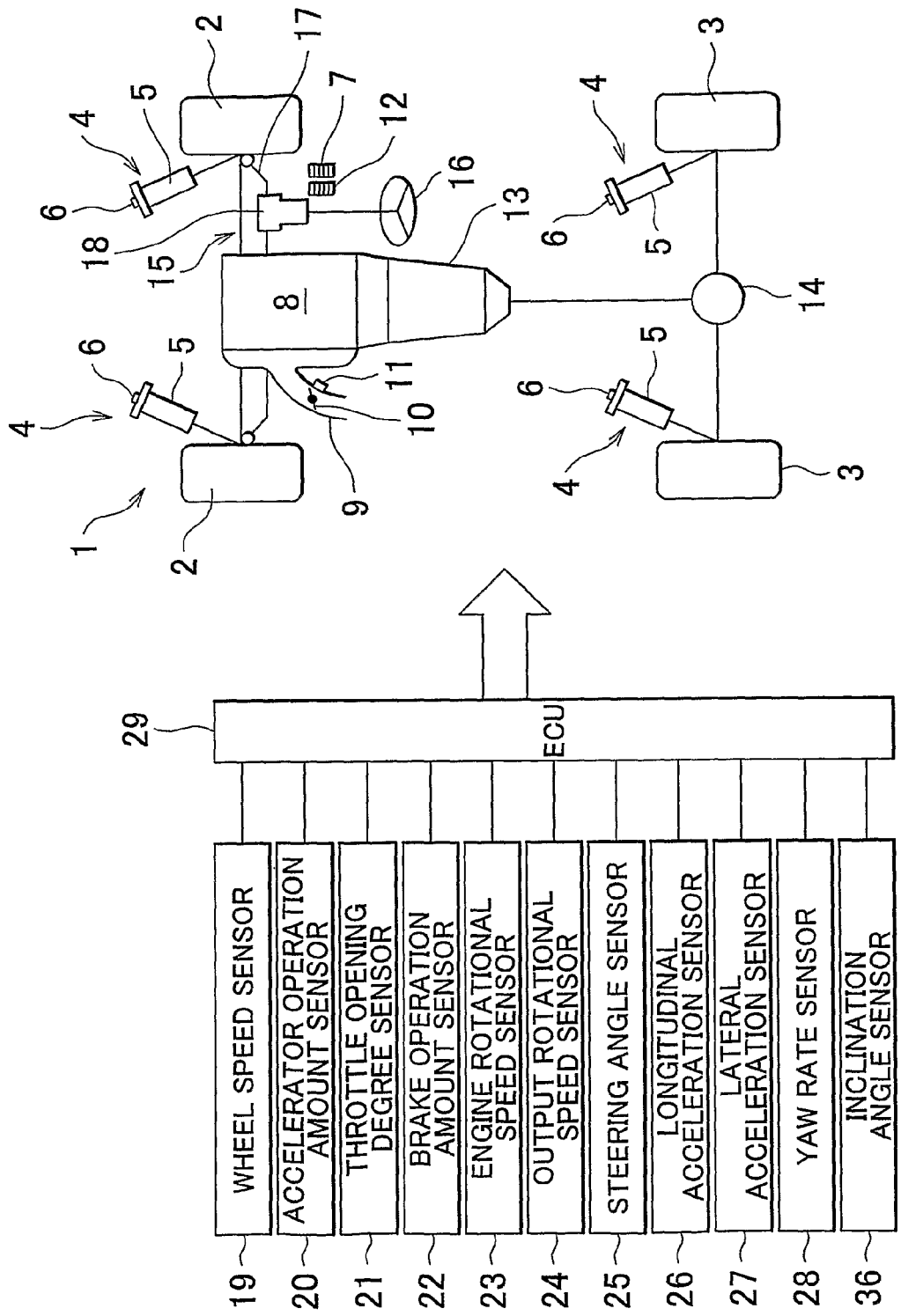

VEHICLE CONTROL SYSTEM

INCORPORATION BY REFERENCE

The disclosure of Japanese Patent Applications No. 2009-189499 filed on Aug. 18, 2009, No.2010-056597 filed on Mar. 12, 2010 and No.2010-056599 filed on Mar. 12, 2010, including the specifications, drawings and abstracts is incorporated herein by references in its entirety.

BACKGROUND OF THE INVENTION

1. Field of the Invention

The invention relates to a vehicle control system that is configured to control behavior characteristics or acceleration/deceleration characteristics (which will be called "running characteristics") of the vehicle, such as a power characteristic, steering characteristic and a suspension characteristic of the vehicle, so that the running characteristics match a running environment and driver's preferences and intention regarding running.

2. Description of the Related Art

While the vehicle behavior, such as a vehicle speed and a running direction, varies according to the driver's accelerating/decelerating operation and steering operation, the relationship between the amount of the driver's operation and the amount of change of the behavior is determined not only by the energy efficiency, such as a fuel efficiency, but also by characteristics, such as a ride comfort, quietness and power performance, which are required of the vehicle.

In the meantime, environments in which the vehicle runs include a wide variety of surroundings or road types, such as an urban area, an expressway, a winding road, an uphill, and a downhill, and there are a variety of driver's preferences and intentions regarding running, and there are a variety of impressions the driver receives from the vehicle during running. Therefore, an expected running characteristic is not necessarily obtained if the running environment changes or the vehicle is driven by another driver. As a result, so-called driveability may deteriorate.

Thus, one type of vehicle has been developed which is arranged to manually select running characteristics, such as a power output characteristic (or acceleration characteristic) and a suspension characteristic, concerning the behavior of the vehicle, by operating a mode selection switch. Namely, the vehicle is arranged to manually select a drive mode from, for example, a sporty mode in which the vehicle runs with an excellent accelerating ability, and the suspension is set to be somewhat hard, a normal mode in which the vehicle accelerates at a relatively low rate, and has a relatively soft suspension characteristic, and an eco mode in which the fuel economy or efficiency is prioritized, by operating the switch.

In addition, Japanese Patent Application Publication No. 10-77894 (JP-A-10-77894) describes a system that is configured to estimate the driving orientation of a vehicle on the basis of an output operation amount of the vehicle. The system described in JP-A-10-77894 is configured to determine a maximum value of a throttle valve opening degree that serves as the output operation amount of the vehicle and, when a deviation between the maximum value of the throttle valve opening degree and a throttle valve opening degree after a lapse of a predetermined period of time from when the throttle valve opening degree attains the maximum value is larger than a predetermined criterion value, prohibit estimation of the driving orientation based on the throttle valve opening degree. Specifically, for example, it is determined whether there is a so-called chip-in operation, such as steep depression and release operations of an accelerator pedal in a short period of time, that occurs depending on a driver's habit or a road condition, and, when it is determined that there is the chip-in operation, estimation of the driving orientation is prohibited.

In addition, Japanese Patent Application Publication No. 8-28640 (JP-A-8-28640) describes a control system for a vehicle equipped with a continuously variable transmission. The control system is configured to detect the gradient of a road (or the gradient resistance of the vehicle) and then filter the detected gradient using a low-pass filter to thereby prevent hunting of shift control due to a slight variation in the gradient.

The systems described in JP-A-06-249007 is configured to change a driver's driving orientation or a running characteristic on the basis of the longitudinal acceleration of the vehicle or a driver's accelerator operation. Therefore, by detecting or estimating the behavior of the acceleration of the vehicle, it is possible to estimate a driver's driving orientation and then incorporate the estimated driver's driving orientation into vehicle behavior control. However, for example, when the driver conducts such a driving operation as described in JP-A-10-77894, such as depression and release of an accelerator pedal and depression of a brake pedal, the variation component of the acceleration of the vehicle due to the influence of such a driving operation is incorporated as a so-called noise component and, as a result, the accuracy of estimating a driving orientation may possibly decrease. Different from the above, for example, when the vehicle runs on a big bumpy road surface, a road surface with a change in gradient, or the like, the variation component of the acceleration of the vehicle due to the influence of the running road surface is incorporated as a so-called noise component and, as a result, the accuracy of estimating a driving orientation may possibly decrease. In this way, in the existing art, there is still room for improvement in the accuracy of estimating a driver's driving orientation and adequate incorporation of a driver's request or driving orientation into a running characteristic.

SUMMARY OF INVENTION

The invention provides a vehicle control system that causes driver's preferences and intention regarding running or running conditions of the vehicle to be accurately reflected by running characteristics, such as the behavior of the vehicle or the acceleration.

An aspect of the invention provides a vehicle control system that obtains an index indicating a running condition of a vehicle on the basis of a vehicle parameter indicating a motion of the vehicle and then sets a running characteristic of the vehicle in accordance with the index. The vehicle control system includes a noise reduction unit that is configured to obtain the index on the basis of the vehicle parameter of which a fluctuating component that fluctuates due to a condition of a running road surface is attenuated.

With the above vehicle control system, for example, when the index is obtained on the basis of a vehicle parameter that indicates a motion of the vehicle, such as a vehicle speed, an acceleration of the vehicle and a rotational speed of each wheel, a fluctuating component of the vehicle parameter due to a condition of a running road surface is attenuated. In other words, for example, the vehicle control system removes a temporary or instantaneous fluctuating component of the vehicle parameter, which occurs because of a rough driving operation, such as quick acceleration, quick braking and quick steering, or because of a change of a road surface condition, such as irregularities of a road surface and a gradient of a hill. Therefore, it is possible to suppress the influence of a variation in vehicle parameter on the resultant index although the influence is not intended by the driver and, as a result, an actual behavior of the vehicle may be further adequately incorporated into the index. Hence, the vehicle is able to provide a running characteristic suitable for a driving orientation, a running environment such as a running road, or the like.

Here, in the vehicle control system, the vehicle parameter may include an acceleration of the vehicle.

With the above vehicle control system, when the index is obtained on the basis of an acceleration of the vehicle, a fluctuating component of the acceleration due to a driver's driving operation is attenuated. In other words, for example, the vehicle control system removes a temporary or instantaneous fluctuating component of the acceleration, which occurs because of a rough driving operation, such as quick acceleration, quick braking and quick steering. Therefore, it is possible to suppress the influence of a variation in acceleration on the resultant index although the influence is not intended by the driver and, as a result, an actual behavior of the vehicle may be further adequately incorporated into the index. Hence, the vehicle is able to provide a running characteristic suitable for a driving orientation, a running environment such as a running road, or the like.

In addition, in the vehicle control system, the noise reduction unit may be configured to attenuate a noise component of a predetermined frequency in the fluctuating component.

With the above vehicle control system, a noise component of a predetermined frequency in the fluctuating component of the acceleration, which fluctuates because of a driver's driving operation, is attenuated. In other words, the fluctuating component of a predetermined frequency is removed as a noise component. Therefore, a noise component of the acceleration, which interferes with obtaining the index, is removed, and it is possible to obtain the index into which an actual behavior of the vehicle may be further adequately incorporated.

In addition, in the vehicle control system, the noise reduction unit may be configured to attenuate a noise component of a predetermined frequency that falls within a relatively high-frequency band of the fluctuating component by filtering the fluctuating component using a low-pass filter having a predetermined frequency characteristic.

With the above vehicle control system, when the behavior characteristic of the vehicle is changed on the basis of an acceleration of the vehicle or when an acceleration of the vehicle is incorporated into the behavior characteristic of the vehicle, a temporary or instantaneous fluctuating component of the acceleration due to a driver's driving operation, that is, a fluctuating component in a specific high-frequency band, which becomes a noise, is removed by the low-pass filter that is compatible with the specific high-frequency band. Therefore, it is possible to appropriately suppress the influence of a variation in acceleration, that is, a noise of the fluctuating component, on the resultant index although the influence is not intended by the driver and, as a result, an actual behavior of the vehicle may be further adequately incorporated into the index.

In addition, in the vehicle control system, the noise reduction unit may be configured to attenuate a noise component of a predetermined frequency that falls within a predetermined frequency band of the fluctuating component by filtering the fluctuating component using a band-pass filter having a predetermined frequency characteristic.

With the above vehicle control system, when the behavior characteristic of the vehicle is changed on the basis of an acceleration of the vehicle or when an acceleration of the vehicle is incorporated into the behavior characteristic of the vehicle, a temporary or instantaneous fluctuating component of the acceleration due to a variation in the condition of a running road surface, that is, a fluctuating component in a specific frequency band, which becomes a noise, is removed by the band-pass filter that is compatible with the specific frequency band. Therefore, it is possible to appropriately suppress the influence of a variation in acceleration, that is, a noise of the fluctuating component, on the resultant index although the influenced is not intended by the driver and, as a result, an actual behavior of the vehicle may be further adequately incorporated into the index.

In addition, the filter used in the noise reduction unit may be the same filter as that used in a unit other than the noise reduction unit or may be different from that used in a unit other than the noise reduction unit. In addition, in the filter used in the noise reduction unit, a filter characteristic for a component in a longitudinal direction of the vehicle may be different from a filter characteristic for a component in a lateral direction of the vehicle. Furthermore, the filter used in the noise reduction unit may have a filter characteristic that is varied in accordance with a speed range of the vehicle.

BRIEF DESCRIPTION OF DRAWINGS

The features, advantages, and technical and industrial significance of this invention will be described below with reference to the accompanying drawings, in which like numerals denote like elements, and wherein:

FIG. 2 is a block diagram that shows the procedure by which accelerations detected in order to obtain a command SPI are filtered by the noise reduction unit according to the embodiment of the invention, and is a block diagram of a portion subsequent to the block diagram of FIG. 1;

FIG. 15 is a block diagram of control that incorporates a correction vehicle height, a correction attenuation coefficient and a correction spring constant that are obtained on the basis of a command SPI into a suspension characteristic; and FIG. 16 is a view that schematically shows a vehicle to which the embodiment of the invention may be applied.

DETAILED DESCRIPTION OF EMBODIMENTS

Figure 1:
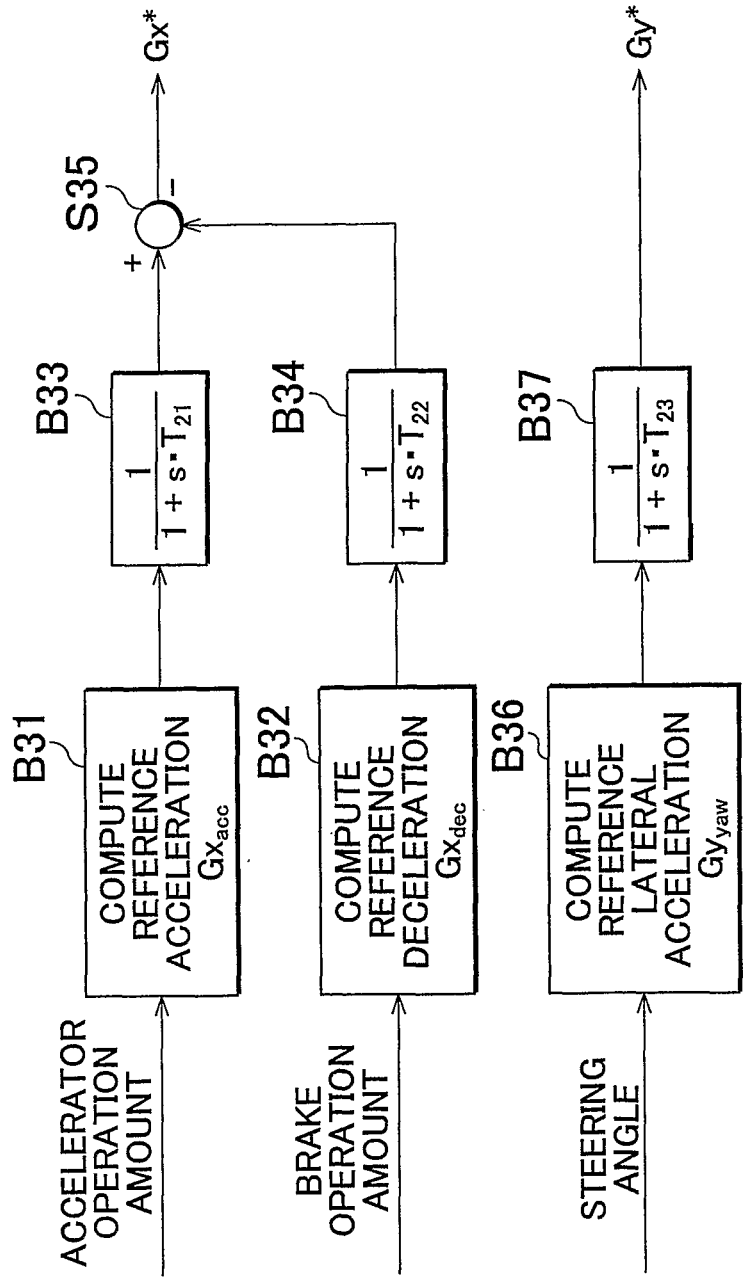
FIG. 1 is a block diagram that shows a procedure by which accelerations detected in order to obtain a command SPI are filtered by a noise reduction unit according to an embodiment of the invention.

An embodiment of the invention will be described with reference to specific examples. In the embodiment of the invention, a vehicle subjected to control accelerates, decelerates or turns by driver's operation. A typical example of the vehicle is an automobile that uses an internal combustion engine or a motor as a driving force source. FIG. 16 schematically shows one example of the vehicle. The vehicle 1 is an automobile that includes four wheels consisting of two steered front wheels 2 and two driving rear wheels 3. Each of these four wheels 2 and 3 is assembled to a vehicle body (not shown) by a suspension device 4. Each suspension device 4, as well as a generally known suspension device, is principally formed of a spring and a shock absorber (damper). FIG. 16 shows the shock absorbers 5. Each shock absorber 5 causes cushioning action using the flow resistance of a fluid, such as gas and liquid, and is able to change the flow resistance by an actuator, such as a motor 6. That is, when the flow resistance of each shock absorber 5 is increased, the vehicle body is hard to squat down and provides a so-called stiff characteristic. Then, the behavior of the vehicle 1 becomes less comfortable and provides an increased sporty feel. Note that the vehicle 1 may be configured to adjust the vehicle height by supplying or drawing pressurized gas to or from these shock absorbers 5.

Brake devices (not shown) are provided for the respective front and rear wheels 2 and 3. The brake devices are operable to apply braking force to the respective front and rear wheels 2 and 3 when a brake pedal 7 arranged at a driver seat is depressed.

The driving force source of the vehicle 1 is a generally known driving force source, such as an internal combustion engine, a motor and a combination of them. FIG. 16 shows an example of the vehicle 1 equipped with an internal combustion engine (engine) 8. A throttle valve 10 for controlling an intake air flow rate is arranged in an intake pipe 9 of the engine 8. The throttle valve 10 is an electronic throttle valve. The throttle valve 10 is, for example, opened or closed by an electrically controlled actuator 11, such as an electric motor and an electromagnetic valve, to thereby adjust the opening degree. Then, the actuator 11 operates in accordance with a depression amount of an accelerator pedal 12 arranged at the driver seat, that is, an accelerator operation amount, to thereby adjust the throttle valve 10 to a predetermined opening degree (throttle opening degree).

The relationship between an accelerator operation amount and a throttle opening degree may be appropriately set. As the relationship therebetween approaches a one-to-one relationship, the driver more strongly experiences a so-called direct feel and, therefore, the running characteristic of the vehicle 1 becomes a sporty feel. In contrast, when the relationship between an accelerator operation amount and a throttle opening degree is set so that the throttle opening degree is relatively lower than the accelerator operation amount, the behavior characteristic or running characteristic of the vehicle 1 becomes a so-called mild feel. When the motor is used as a driving force source, a current controller, such as an inverter and a converter, is provided instead of the throttle valve 10. Then, the current controller is configured to adjust supplied current in accordance with an accelerator operation amount and to appropriately change the relationship of a current value with respect to an accelerator operation amount, that is, the behavior characteristic or running characteristic.

A transmission 13 is coupled to an output side of the engine 8. The transmission 13 is configured to appropriately change the ratio between an input rotational speed and an output rotational speed, that is, a speed ratio. The transmission 13 is, for example, a generally known transmission, such as a step-gear automatic transmission, a belt-type continuously variable transmission and a toroidal-type continuously variable transmission. Thus, the transmission 13 includes an actuator (not shown). The transmission 13 is configured to change the speed ratio in a stepwise manner or continuously by appropriately controlling the actuator.

In the shift control over the transmission 13 a shift map that defines a speed ratio in correspondence with a state of the vehicle 1, such as a vehicle speed and an accelerator operation amount, is prepared in advance, and shift control is executed in accordance with the shift map. Alternatively, a target output is calculated on the basis of a state of the vehicle 1, such as a vehicle speed and an accelerator operation amount, a target engine rotational speed is obtained from the target output and an optimal fuel efficiency line, and then shift control is executed so as to attain the target engine rotational speed.

In the shift control according to the embodiment of the invention it is possible to select fuel efficiency priority control or driving force increasing control for the above described basic shift control. Fuel efficiency priority control is control for upshifting at a relatively low vehicle speed or control for using a relatively high-speed-side speed ratio (low speed ratio) at a low vehicle speed. On the other hand, driving force increasing control or accelerating characteristic increasing control is control for upshifting at a relatively high vehicle speed or control for using a relatively low-speed-side speed ratio (high speed ratio) at a high vehicle speed. These controls may be executed, for example, in such a manner that a shift map is changed, a drive request amount is corrected or a calculated speed ratio is corrected.

Note that a transmission mechanism, such as a torque converter equipped with a lock-up clutch, may be provided for the vehicle 1 between the engine 8 and the transmission 13 where necessary. Then, an output shaft of the transmission 13 is coupled to the rear wheels 3 via a differential gear 14 that is a final reduction gear.

A steering device 15 turns the direction of the front wheels 2 for steering. The steering device 15 includes a steering linkage 17 and an assist mechanism 18. The steering linkage 17 transmits the rotating motion of a steering wheel 16 to the right and left front wheels 2. The assist mechanism 18 assists the steering angle or steering force of the steering wheel 16. The assist mechanism 18 includes an actuator (not shown), and is able to adjust an assist amount assisted by the actuator. Specifically, as the assist amount is reduced, the relationship between a steering force and an actual turning force of the front wheels 2 approaches a one-to-one relationship, that is, the relationship between a steering angle and an actual turning angle of the front wheels 2 eventually approaches a one-to-one relationship. As a result, the driver experiences a so-called increased direct feel in steering, and the running characteristic of the vehicle 1 becomes a so-called sporty feel.

Note that, although not specifically shown in the drawing, the vehicle 1 is equipped with an anti-lock brake system (ABS), a traction control system (TRC), a vehicle stability control system (VSC), and the like, for stabilizing the behavior or attitude. The vehicle stability control system (VSC) comprehensively controls these systems. These systems are generally known. These systems are configured to decrease braking force exerted on the wheels 2 and 3 or exert braking force on the wheels 2 and 3 on the basis of a deviation between a vehicle body speed and a wheel speed and, additionally, control engine torque at the same time to thereby prevent or suppress a lock or slip of the wheels 2 and 3 and then stabilize the behavior of the vehicle 1. In addition, the vehicle 1 may be provided with a navigation system that is able to obtain data in connection with a running road or a planned running road (that is, running environment) and/or a switch for manually selecting a running mode, such as a sporty mode, a normal mode and a low fuel consumption mode (eco mode). Furthermore, the vehicle 1 may include a four wheel drive mechanism (4WD) that is able to change the running characteristic, such as hill-climbing performance, accelerating performance and a turning characteristic.

Then, the vehicle 1 includes various sensors that acquire data for controlling the engine 8, the transmission 13; the shock absorbers 5 of the suspension devices 4, the assist mechanism 18, the above described ABS, TRC, VSC, and the like. The sensors are, for example, a wheel speed sensor 19, an accelerator operation amount sensor 20, a throttle opening degree sensor 21, a brake operation amount sensor 22, an engine rotational speed sensor 23, an output rotational speed sensor 24, a steering angle sensor 25, a longitudinal acceleration sensor 26, a lateral acceleration sensor 27, a yaw rate sensor 28, an inclination angle sensor 36, and the like. The wheel speed sensor 19 detects the rotational speed (wheel speed) of each of the front and rear wheels 2 and 3. The accelerator operation amount sensor 20 detects the depression amount of the accelerator pedal 12. The throttle opening degree sensor 21 detects the opening degree of the throttle valve 10. The brake opening degree sensor 22 detects the depression amount of the brake pedal 7. The engine rotational speed sensor 23 detects the rotational speed of the engine 1. The output rotational speed sensor 24 detects the output rotational speed of the transmission 13. The steering angle sensor 25 detects the steering angle of the steering wheel 16. The longitudinal acceleration sensor 26 detects the acceleration in the longitudinal direction (front-rear direction) of the vehicle 1 (longitudinal acceleration Gx). The lateral acceleration sensor 27 detects the acceleration in the lateral direction (transverse direction) of the vehicle 1 (lateral acceleration Gy). The yaw rate sensor 28 detects the yaw rate of the vehicle 1. The inclination angle sensor 36 detects the gradient of a running road surface. Note that the acceleration sensors 26 and 27 may be shared with an acceleration sensor used in vehicle behavior control, such as the above ABS and VSC, and, in the vehicle 1 equipped with an airbag, the acceleration sensors 26 and 27 may be shared with an acceleration sensor provided for controlling deployment of the airbag. Furthermore, the longitudinal and lateral accelerations Gx and Gy may be obtained in such a manner that a value detected by an acceleration sensor inclined at a predetermined angle (for example, 45°) with respect to the longitudinal direction of the vehicle, on a horizontal plane, is decomposed into a longitudinal acceleration and a lateral acceleration. Furthermore, instead of detecting the longitudinal and lateral accelerations Gx and Gy by a sensor, the longitudinal and lateral accelerations Gx and Gy may be computed on the basis of an accelerator operation amount, a vehicle speed, a road load, a steering angle, and the like. A composite acceleration, which will be described later, is not limited to the acceleration including the acceleration components in a plurality of directions, such as the acceleration including the acceleration component in the longitudinal direction of the vehicle and the acceleration component in the width direction (lateral direction) of the vehicle. The acceleration in only one direction may be employed as the composite acceleration. For example, only the acceleration in the longitudinal direction of the vehicle may be employed as the composite acceleration.

The above various sensors 19 to 28 are configured to transmit detected signals (data) to an electronic control unit (ECU) 29. The electronic control unit 29 is configured to compute in accordance with those pieces of data and prestored data and programs and then output the computed results to the above described systems or the actuators of those systems as control command signals.

As described above, the vehicle control system according to the embodiment of the invention is configured to incorporate the running condition of the vehicle 1 into behavior control over the vehicle 1. Here, the running condition of the vehicle 1 is expressed by a longitudinal acceleration, a lateral acceleration, a yawing acceleration, a rolling acceleration or a resultant acceleration (i.e. composite acceleration) of some of these accelerations in the multiple directions. That is, when the vehicle 1 is caused to run at a target speed or travel in a target direction, or when the behavior of the vehicle 1, influenced by a running environment such as a road surface, is returned to an original state, accelerations in multiple directions usually occur in the vehicle 1. Thus, in consideration of this situation, a running environment or a driving orientation is conceivably incorporated in the running condition of the vehicle 1 to some extent. On the basis of the above background, the control system according to the embodiment of the invention is configured to incorporate the running condition of the vehicle 1 into behavior control over the vehicle 1.

In addition, the behavior of the vehicle 1 includes an accelerating characteristic, a turning characteristic, a support stiffness of the suspension devices 4 (that is, the degree of bump/rebound and the tendency of occurrence of bump/rebound), the degree of rolling, the degree of pitching, and the like. The control system according to the embodiment of the invention is configured to change the running characteristics represented by the above characteristics on the basis of the above described running condition. In this case, the running characteristic may be changed by using an acceleration in a certain direction or a composite acceleration, which is an example of the above running condition; however, in order to reduce uncomfortable feeling, an index obtained by correcting the above-mentioned acceleration or composite acceleration may be used.

As an example of the index, a sportiness SPI will be described. The sportiness index SPI is the index indicating the driver's intention or the running condition of the vehicle. The sportiness SPI that may be employed in the embodiment of the invention is an index obtained by combining accelerations in multiple directions (particularly, absolute values thereof). The sportiness SPI is, for example, an acceleration that combines the longitudinal acceleration Gx and the lateral acceleration Gy as an acceleration significantly related to the behavior in the running direction. For example, the sportiness SPI is calculated by the following mathematical expression.

$$\text{instantaneous } SPI = (Gx^2 + Gy^2)^{1/2} \quad (1)$$

Here, the "instantaneous SPI" means an index that is calculated on the basis of accelerations in the respective directions at an interval of each moment during running of the vehicle 1, and is a so-called physical quantity. Note that the "interval of each moment" means each time of repetition when detection of accelerations and calculation of an instantaneous SPI based on the detected accelerations are repeatedly executed at a predetermined cycle time.

In addition, within the longitudinal acceleration Gx used in the above mathematical expression, at least one of the acceleration-side acceleration and deceleration-side acceleration (i.e. deceleration) may be subjected to a normalization operation or a weighting operation. That is, in a general vehicle, the deceleration-side acceleration is larger than the acceleration-side acceleration; however, the difference is almost not experienced or recognized by the driver. In most cases, the driver recognizes that the acceleration-side and deceleration-side accelerations are almost equivalent to each other. Normalization is a process of correcting such a difference between an actual value and a feel experienced by the driver, and is a process of increasing the acceleration-side acceleration or decreasing the deceleration-side acceleration for the longitudinal acceleration Gx.

More specifically, the ratio of the maximum values of these accelerations is obtained, and the acceleration-side or deceleration-side acceleration is multiplied by the ratio. Also, the weighting operation may be performed to correct the deceleration-side acceleration relative to the lateral acceleration. In sum, the weighting operation is to make a correction by, for example, assigning a weight to at least one of the longitudinal (frontward and backward) accelerations, so that the maximum acceleration in each direction lies on a circle of a given radius, as is the case where the longitudinal force and lateral force that can be produced by a tire are represented by a tire friction circle. Through the normalization operation and the weighting operation as described above, the degrees by which the acceleration-side acceleration and deceleration-side acceleration are reflected by the running characteristics become different from each other. A speed-decreasing longitudinal acceleration and a speed-increasing longitudinal acceleration may be subjected to the weighting operation, as one example of the weighting operation, so that the degree of influence of the speed-increasing longitudinal acceleration is higher than the degree of influence of the speed-decreasing longitudinal acceleration.

In this way, an actual acceleration and a feel experienced by the driver are different from each other depending on the direction of the acceleration. For example, there is conceivably such a difference between an acceleration in the yawing direction or rolling direction and a longitudinal acceleration. Then, in the embodiment of the invention, the control system may be configured to vary the degree of incorporation of each of accelerations in different directions into the running characteristic, in other words, the degree of a change in running characteristic based on an acceleration in any one of the directions from the degree of a change in running characteristic based on an acceleration in another direction.

Figure 5:
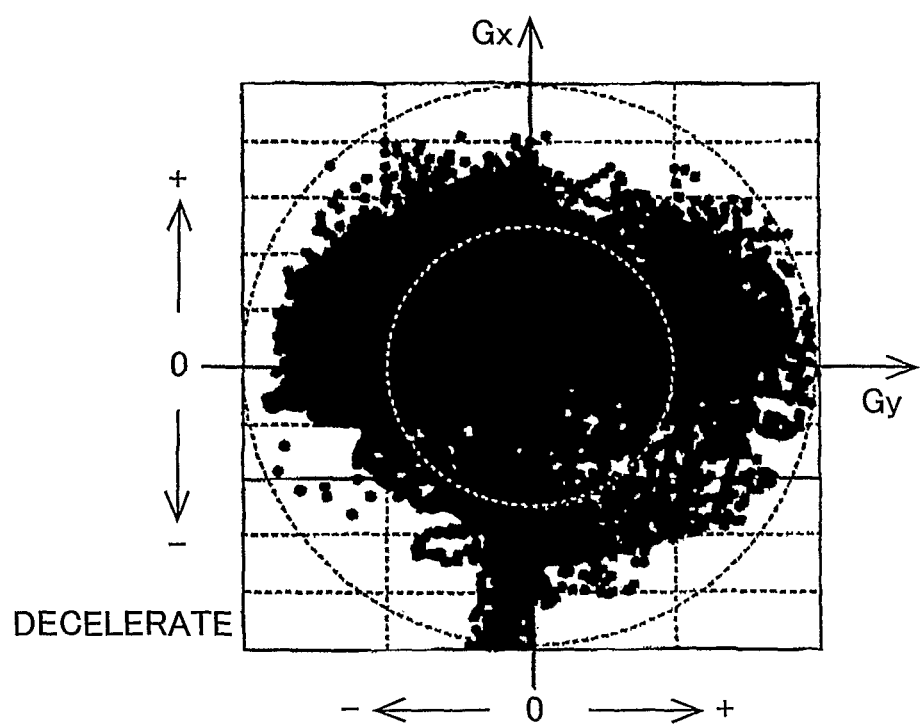
FIG. 5 is a graph that shows detected longitudinal and lateral accelerations plotted on a tire friction circle.

FIG. 5 shows an example of a tire friction circle on which the lateral accelerations Gy detected by the sensor and the longitudinal accelerations Gx on which the above-described normalization operation and weighting operation were performed are plotted. This is an example when a vehicle runs on a test course that simulates an ordinary road. It is observed from FIG. 5, as a general tendency, that the lateral acceleration Gy is also likely to become large when the vehicle is decelerated by a large degree, and the longitudinal acceleration Gx and the lateral acceleration Gy occur along the tire friction circle.

Figure 6:
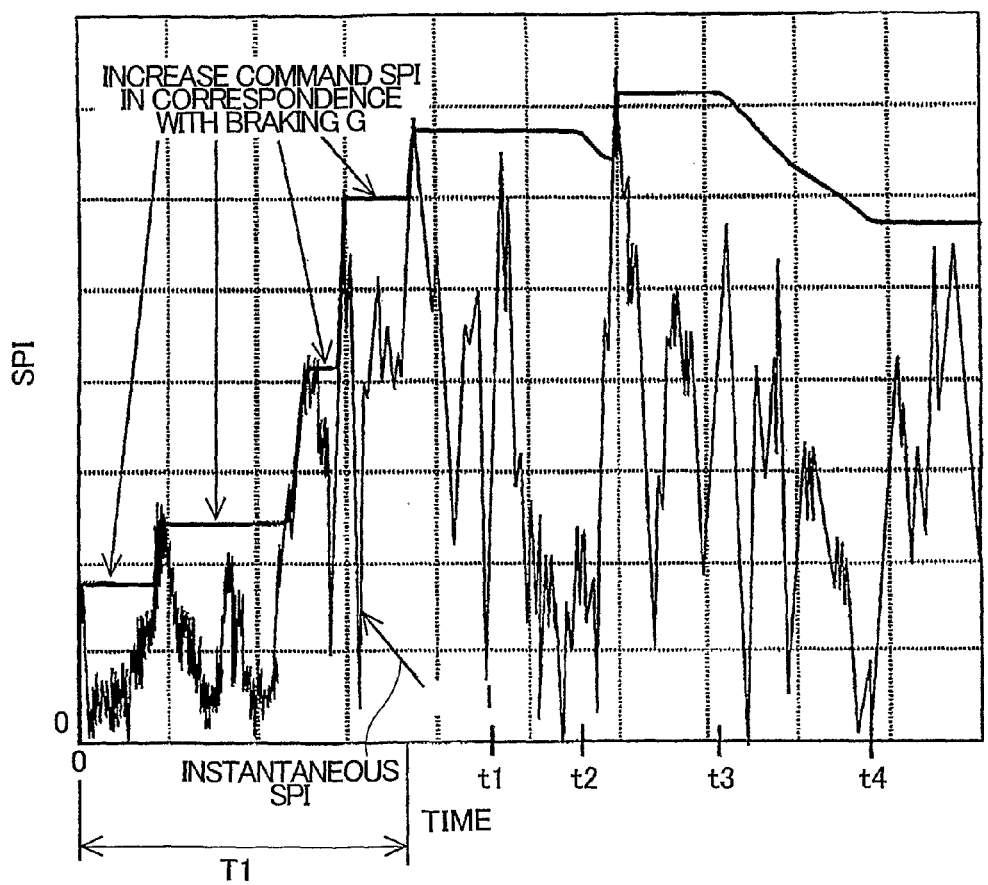
FIG. 6 is a view that shows an example of a variation in command SPI obtained on the basis of a variation in instantaneous SPI.

Then, in the embodiment of the invention, a command SPI is obtained from the above instantaneous SPI The command SPI is an index used in control for changing the running characteristic, and is configured to immediately increase with an increase in instantaneous SPI that is a base for calculating the command SPI and contrarily decrease with a delay for a decrease in instantaneous SPI Particularly, in the embodiment of the invention, the command SPI is configured to decrease because of a factor that a predetermined condition is satisfied. FIG. 6 shows a variation in command SPI obtained on the basis of a variation in instantaneous SPI. In the example shown here, the instantaneous SPI is indicated by values plotted in FIG. 5; whereas, the command SPI is set at a local maximum value of the instantaneous SPI and is kept at the last value until a predetermined condition is satisfied. That is, in the embodiment of the invention, the command SPI is an index that quickly increases and relatively slowly decreases.

More specifically, during a period $T_1$ after a start of control in FIG. 6, for example, in the case where the vehicle is decelerating and turning, the instantaneous SPI obtained by the variation in the acceleration increases and decreases; however, the instantaneous SPI that is larger than the last local maximum value occurs before the above described predetermined condition is satisfied, so the command SPI increases in a stepwise manner. In contrast, at t2 or t3, for example, in the case where the vehicle, which has turned and accelerated, starts to run straight and accelerate, the command SPI decreases because a condition for decreasing the command SPI is satisfied. Thus, the condition for reducing the command SPI is satisfied when a condition where the command SPI kept at the previous large value is not considered to reflect the driver's intention is established. In the embodiment, the condition is satisfied upon a lapse of a specified time.

Namely, the condition where the command SPI kept at the previous value is not considered to reflect the driver's intention is a condition in which a deviation between the command SPI that is kept at the previous value and the instantaneous SPI that appears in the meantime is relatively large, and the deviation continues to be large. Accordingly, the command SPI is not reduced due to the instantaneous SPI resulting from, for example, the driver's operation of temporarily releasing the accelerator pedal 12, for example, when the vehicle is controlled to turn and accelerate. When a condition where the instantaneous SPI resulting from, for example, the driver's operation of continuously releasing the accelerator pedal is lower than the kept command SPI continues for a given period of time, for example, when the vehicle gradually decelerates, it is determined that a condition for reducing the command SPI is satisfied.

In this way, the condition for decreasing the command SPI may be a duration during which the instantaneous SPI is lower than the command SPI. In addition, in order to accurately incorporate an actual running condition into the command SPI, it is applicable that the condition for decreasing the command SPI is satisfied when a time integral value (or an accumulated value) of a deviation between the kept command SPI and the instantaneous SPI reaches a predetermined threshold. Note that the threshold may be appropriately set by a running experiment or a simulation conducted according to the driver's intention. When the latter time integral value is used, the command SPI is decreased in consideration of a deviation between the command SPI and the instantaneous SPI and a period of time, so control for changing the running characteristic into which an actual running condition or a behavior is further adequately incorporated is possible.

Note that, in the example shown in FIG. 6, a period of time during which the command SPI is held up to t2 is longer than a period of time during which the command SPI is held up to t3; however, this is because the following control is configured to be performed. That is, the command SPI is increased and held at the last stage of the above described period $T_1$ and, after that, the instantaneous SPI increases at tl before the above described condition for decreasing the command SPI is satisfied, and further, the integral value of a deviation between the held command SPI and the instantaneous SPI is lower than or equal to a predetermined value. Note that the predetermined value may be appropriately set by an experiment or a simulation conducted according to the driver's intention, or in consideration of a calculation error of the instantaneous SPI.

In this way, the fact that the instantaneous SPI is close to the held command SPI means that the vehicle is placed in the accelerating/decelerating condition and/or turning condition that has generated the instantaneous SPI based on which the held command SPI is determined or in a condition close to the above. That is, even when a certain period of time has elapsed after the time at which the command SPI is increased to the held value, the running condition is approximate to the running condition at the time before the period of time elapses. Therefore, even if the instantaneous SPI is lower than the held command SPI, the duration for satisfying the above described condition for decreasing the command SPI is extended so as to hold the last command SPI. Control or process for extending the duration may be performed in such a manner that an integrated value (accumulated value) of an elapsed time described above or an integral value of a deviation between the above described command SPI and the instantaneous SPI is reset and then accumulation of an elapsed time or integration of the deviation is resumed, the accumulated value or integral value is reduced by a predetermined amount, or accumulation or integration is interrupted for a constant period of time, or the like.

Figure 7:
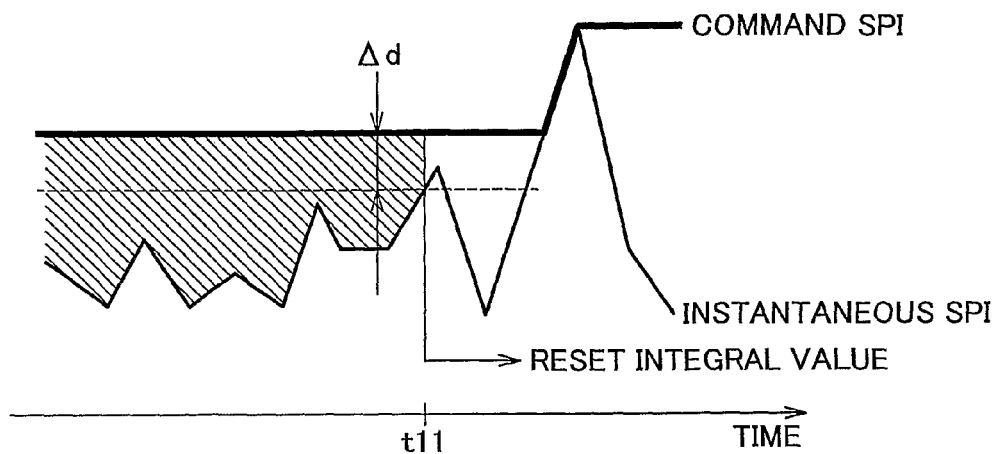
FIG. 7 is a view for illustrating the time integral of a deviation between the instantaneous SPI and the command SPI and a situation in which the integral value is reset.

FIG. 7 is a time chart for illustrating integration of a deviation between the above described command SPI and instantaneous SPI and the timing at which the integral value is reset. Note that the hatched area in FIG. 7 corresponds to an integral value of the deviation. In the time chart of FIG. 7, the integral value is reset at t11 at which a deviation between the instantaneous SPI and the command SPI is smaller than or equal to a predetermined value Δd and then integration of the deviation is started again. Thus, even when a duration during which the command SPI is held at a predetermined value extends, the condition for decreasing the command SPI is not satisfied, so the command SPI is kept at the last value. Then, after resuming integration, as the instantaneous SPI becomes larger than the held command SPI, the command SPI is updated to the large value corresponding to the instantaneous SPI and then held at this value, and the above-described integral value is reset.

When it is determined whether the condition for decreasing the command SPI is satisfied on the basis of the above integral value, it is desirable to vary the degree or inclination of decrease in command SPI. The above described integral value is obtained by integrating a deviation between the held command SPI and the instantaneous SPI with respect to time. Therefore, when the deviation is large, the integral value reaches the predetermined value in a short period of time, and then the condition for decreasing the command SPI is satisfied. On the other hand, when the deviation is small, the above described integral value reaches the predetermined value in a relatively long period of time, and then the condition for decreasing the command SPI is satisfied.

Thus, for example, the degree or inclination of decrease in command SPI may be varied in accordance with an elapsed time until the condition for decreasing the command SPI is satisfied. If the above condition is satisfied in a short time, it means that the width of decrease in instantaneous SPI with respect to the held command SPI is large, the command SPI greatly deviates from the driver's intention at that time. Then, in such a case, the command SPI is decreased at a large rate or a large inclination. In contrast, when a period of time elapsed until the condition for decreasing the command SPI is satisfied is relatively long, the width of decrease in instantaneous SPI with respect to the held command SPI is small, so the command SPI may not significantly deviate particularly greatly from the driver's intention at that point in time. Then, in such a case, the command SPI is slowly decreased at a small rate or a small inclination. By so doing, a deviation between the command SPI for setting the running characteristic and the driver's intention is quickly and accurately corrected, and the running characteristic of the vehicle 1 may be set so as to conform to the running condition.

The above described command SPI indicates the running condition of the vehicle 1, and includes a running environment, such as a Toad surface gradient, the presence or absence of a corner and the curvature of the corner, and a driver's driving orientation. This is because the acceleration of the vehicle 1 varies depending on a condition of a running road, accelerating/decelerating and steering operations are conducted by the driver on the basis of the condition of the running road and then the acceleration varies in accordance with the operations. The control system according to the embodiment of the invention is configured to utilize the command SPI for control over the running characteristic of the vehicle 1.

In addition, the running characteristic in the embodiment of the invention includes an accelerating characteristic, a steering characteristic, a suspension characteristic, a sound characteristic, and the like. These characteristics may be appropriately set in such a manner that the above described control characteristic of the throttle valve 10, the shift characteristic of the transmission 13, the damping characteristic of the shock absorber 5 of each suspension device 4, the assist characteristic of the assist mechanism 18, and the like, are changed by the associated actuators. A change in the running characteristic is generally such that, as the command SPI increases, the vehicle is able to achieve so-called more sporty running.

Figure 8:
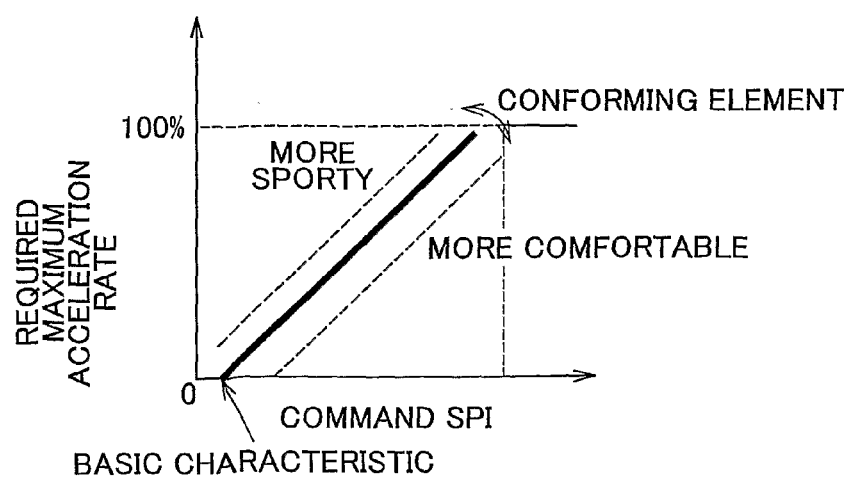
FIG. 8 is a map that shows the relationship between a command SPI and a required maximum acceleration rate.

As one example of changing the running characteristic, an example in which the accelerating characteristic of the vehicle 1 is changed in accordance with the command SPI will be described with reference to FIG. 8. That is, an example in which a required maximum acceleration rate is obtained in correspondence with the command SPI set as described above will be described. In FIG. 8, the required maximum acceleration rate defines a margin driving force. For example, the required maximum acceleration rate 100% indicates that the maximum acceleration that can be generated by the vehicle 1 is possible and a speed ratio at which the engine rotational speed is maximal or the highest speed ratio (speed ratio at the lowermost vehicle speed side) is set for the transmission 13. In addition, for example, the required maximum acceleration rate 50% indicates that a half of the maximum acceleration that can be generated by the vehicle 1 is possible and an intermediate speed ratio is set for the transmission 13.

In the example shown in FIG. 8, as the command SPI increases, the required maximum acceleration rate increases. The basic characteristic indicated by the solid line in FIG. 8 is obtained by calculating the relationship between a command SPI and a required maximum acceleration rate on the basis of data acquired when the vehicle 1 is actually caused to run, and includes appropriate corrections through actual vehicle running or a simulation. When a characteristic line is set on a side at which the required maximum acceleration rate is larger than that of the basic characteristic, the instantaneous acceleration of the vehicle 1 may be relatively large, so the characteristic is a so-called sporty running characteristic or sporty accelerating characteristic. In contrast, when the characteristic line is set on a side at which the required maximum acceleration rate decreases, the instantaneous acceleration of the vehicle 1 may be relatively small, so the characteristic is a so-called comfortable running characteristic or comfortable accelerating characteristic. These adjustments (that is, conforming or tuning) may be appropriately performed in accordance with salability required of the vehicle 1. Note that the reason why, in the basic characteristic, the required maximum acceleration rate becomes 0 when the command SPI is larger than 0 is because a slight speed running condition, such as running in a traffic jam and putting the vehicle into a garage, is not incorporated into control for setting or changing the running characteristic.

Figure 9:
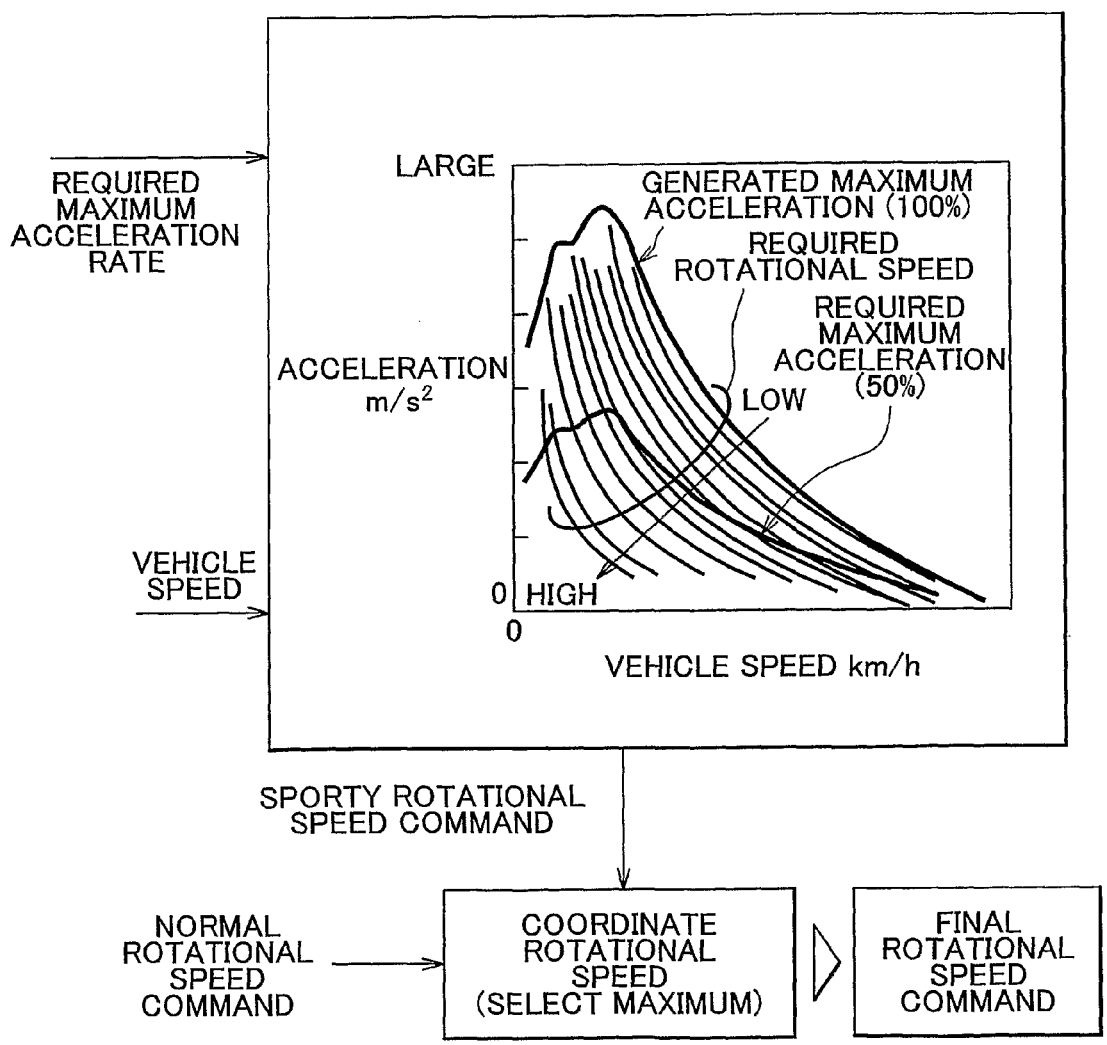
FIG. 9 is a graph that shows the relationship at each required rotational speed between a vehicle speed and an acceleration with a required acceleration based on a command SPI and a view that illustrates a procedure by which a final command rotational speed is obtained on the basis of the graph.

Control for changing the accelerating characteristic by incorporating the above required maximum acceleration rate into the shift characteristic of the transmission 13 will be described. In the vehicle 1 equipped with a continuously variable transmission as the transmission 13 or a hybrid vehicle that is able to control the engine rotational speed by a motor, a target output is calculated on the basis of a vehicle speed and a drive request amount, and then control is performed so as to attain the engine rotational speed that achieves the target output. The relationship at each required rotational speed between a vehicle speed and an acceleration is shown in FIG. 9. The required maximum acceleration rate obtained from the command SPI on the basis of FIG. 8 is added to the relationship in FIG. 9. For example, the required maximum acceleration rates 100% and 50% are added and indicated by the wide solid lines in FIG. 9. Thus, a rotational speed indicated by a line that passes through an intersection of a line indicating a required maximum acceleration obtained from the command SPI and a line indicating a vehicle speed at a current point in time is a required rotational speed.

The vehicle 1 equipped with the transmission 13 and described with reference to FIG. 16 includes a basic shift map in order to control a speed ratio that should be set by the transmission 13. For a continuously variable transmission, the shift map sets a speed ratio in accordance with a vehicle speed and an engine rotational speed. The engine rotational speed obtained from a predetermined vehicle speed and a predetermined speed ratio using the map is a so-called normal rotational speed. The so-called rotational speed is compared (coordinated in rotational speed) with a rotational speed obtained from FIG. 9 rotational speed), and the higher rotational speed is selected. That is, a maximum value is selected. The thus selected rotational speed is instructed as a target value, that is, a target rotational speed. In the continuously variable transmission, shift control is performed toward a low vehicle speed side speed ratio (high speed ratio). As a result, as the speed ratio increases, a maximum driving force or an engine brake force increases, the behavior control over the vehicle 1 becomes quick, and then the characteristic provides a so-called sporty feel or is appropriate for a driver's driving orientation or a running environment, such as a condition of a running road. Note that the above control may be executed when, for example, a sporty mode is selected with a mode selection switch installed on the vehicle, and the control may be prohibited when, for example, the sporty mode is not selected.

Figure 10:
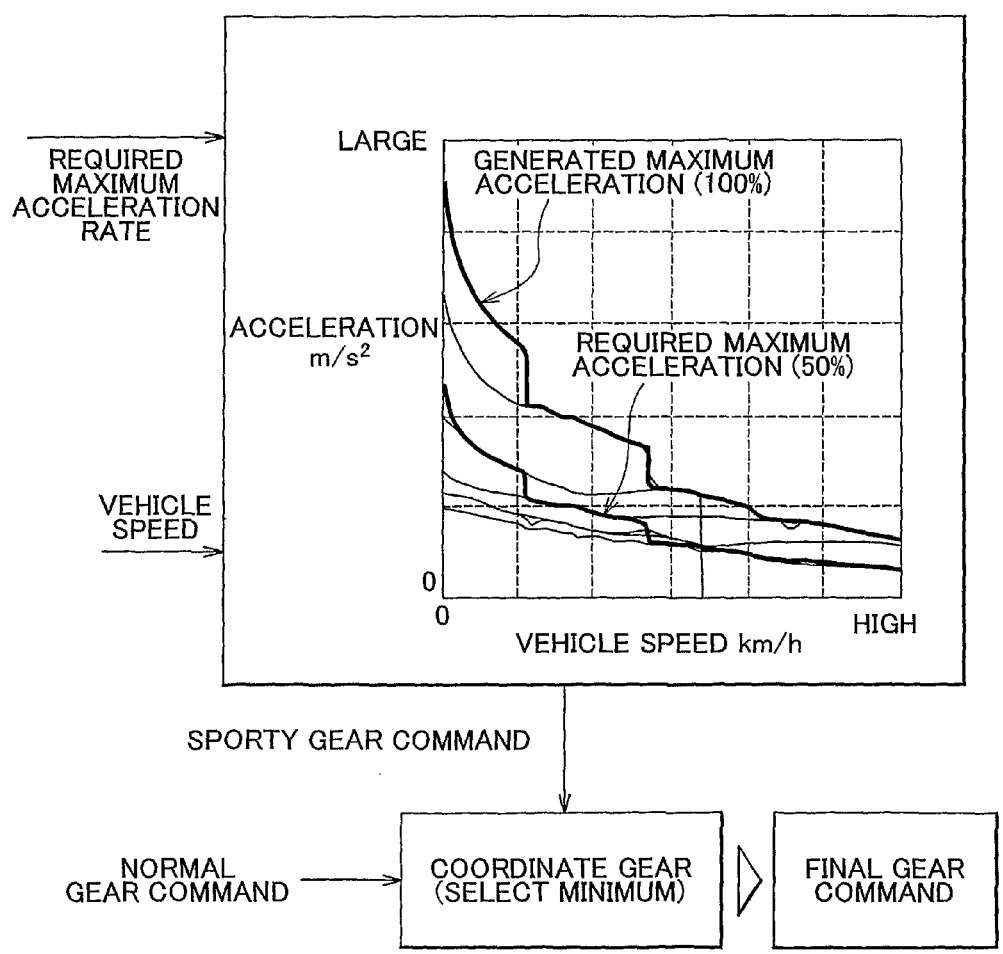
FIG. 10 is a graph that shows the relationship at each gear between a vehicle speed and an acceleration with a required acceleration based on a command SPI and a view that illustrates a procedure by which a final command gear is obtained on the basis of the graph.

On the other hand, when the transmission 13 is a step-gear transmission, control is performed as shown in FIG. 10. In shift control over the step-gear transmission, a target gear is determined, and then a control command signal is output to an actuator of the transmission 13 so as to set the determined gear. Thus, the relationship at each gear between a vehicle speed and an acceleration is shown in FIG. 10. The lines of the required maximum accelerations 100% and 50% are added as the required maximum acceleration rates obtained from the command SPI, and indicated by the wide solid lines in FIG. 10. Thus, a gear indicated by the line of a gear closest to an intersection between a line indicating the required maximum acceleration obtained from the command SPI and a line indicating a vehicle speed at a current point in time is a target gear.

When control is executed by the control system according to the embodiment of the invention, the target gear obtained from FIG. 10 is compared (coordinated in gear) with a target gear based on a shift line map prepared in advance (for example, the gear ratio which is determined based on the accelerator operation and the vehicle speed), and then a low vehicle speed side gear having a high speed ratio is selected. That is, a minimum value is selected. The thus selected gear is instructed as a final gear. In the step-gear transmission, shift control is performed toward a low vehicle speed side gear (high speed ratio). As a result, as the speed ratio increases, a maximum driving force or an engine brake force increases, the behavior control over the vehicle 1 becomes quick, and then the characteristic provides a so-called sporty feel or is appropriate for a driver's driving orientation or a running environment, such as a condition of a running road. Note that such control over the vehicle 1 equipped with a step-gear transmission may be configured so that a mode selection switch is provided and then the control is executed when a so-called sporty mode is selected by the switch.

Figure 11:
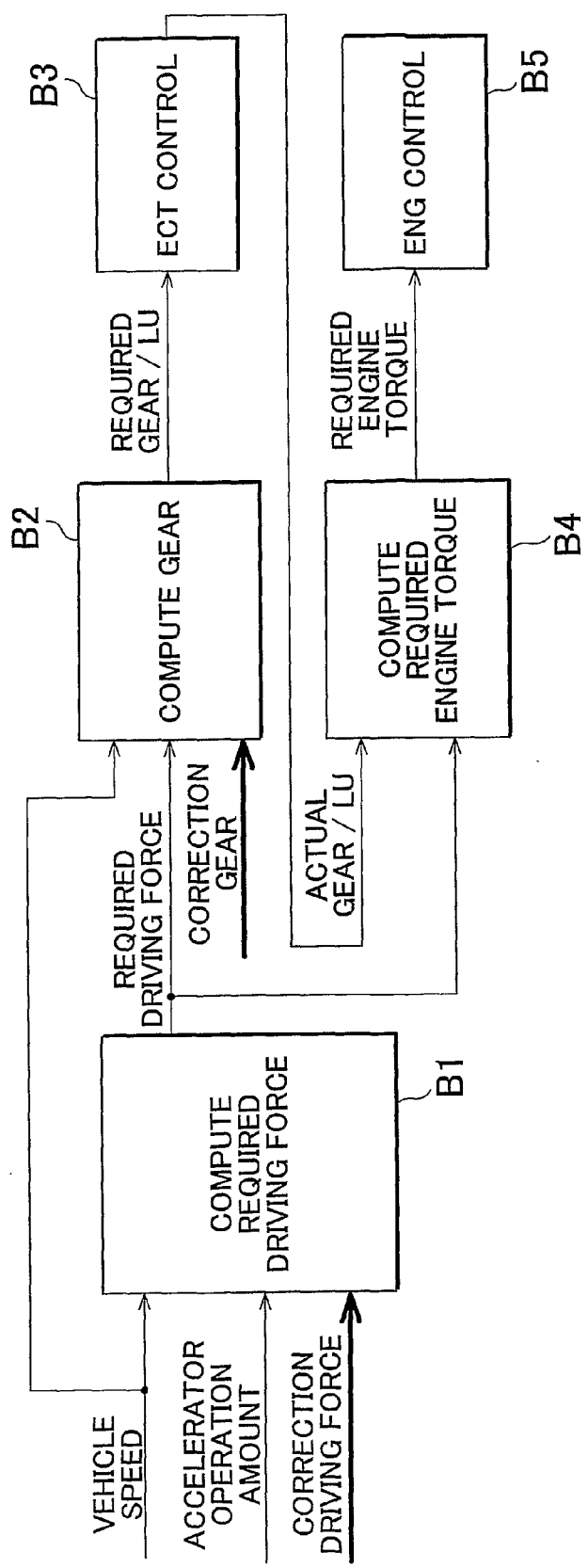
FIG. 11 is a block diagram of control that incorporates a correction gear and a correction driving force that are obtained on the basis of a command SPI into shift control and engine output control in a vehicle equipped with a step-gear automatic transmission.

Next, control for correcting a gear and a driving force and changing the running characteristic in accordance with the correction when the control system according to the embodiment of the invention is applied to the vehicle 1 that includes an internal combustion engine as a driving force source and that is equipped with a step-gear transmission will be described. FIG. 11 is an example in which a target gear and a target engine torque are obtained from a required driving force. In the basic configuration, first, a required driving force is computed from a vehicle speed and an accelerator operation amount (block B1). A required driving force is determined on the basis of a vehicle body weight, power performance imparted to the vehicle 1, and the like, so the computation in block B1 is performed in such a manner that a map that defines a required driving force in correspondence with a vehicle speed and an accelerator operation amount is prepared and then a required driving force is obtained on the basis of the map. Then, a gear is computed on the basis of the required driving force (block B2).

Shift control over the step-gear transmission is performed on the basis of a shift line map that sets a gear region or upshift and downshift lines using a vehicle speed and a required driving force as parameters, so the computation of the gear in the block B2 is performed on the basis of the shift line map prepared in advance. The thus obtained required gear is output to a shift control device (ECT) B3 as a control command signal, and then shift control is executed in the transmission 13. Note that, when a lock-up clutch (LU) is provided in a power transmission path of the vehicle 1, it is determined whether to engage or release the lock-up clutch on the basis of a map prepared in advance, and a command signal for controlling the engagement or release of the lock-up clutch is also output.

On the other hand, a required engine torque is computed on the basis of the required driving force obtained in the block B1 and an actual gear of the transmission 13 (block B4). That is, the engine rotational speed is determined on the basis of the gear and the vehicle speed, so a required engine torque may be computed on the basis of the engine rotational speed and the required driving force. Then, the engine (ENG) 8 is controlled so as to generate the thus obtained required engine torque (block B5). Specifically, the throttle opening degree is controlled.

As described above, in the control system according to the embodiment of the invention, when the longitudinal acceleration Gx, the lateral acceleration Gy or the composite acceleration that combines these longitudinal and lateral accelerations is large, the command SPI increases and, accordingly, the required maximum acceleration increases. The required maximum acceleration is incorporated into shift control as described with reference to FIG. 10. When the gear determined on the basis of the command SPI in the sporty mode is a lower vehicle speed side gear than the gear in the normal mode, the lower vehicle speed side gear becomes a final command gear. The basic configuration described with reference to FIG. 11 is to execute shift control in the normal mode, so, when the final command gear based on the command SPI is a further lower vehicle speed side gear, the gear is acquired in the above block B2 and is then set as the required gear. As a result, a relatively high speed ratio may be obtained, so the instantaneous accelerating characteristic serving as the running characteristic of the vehicle 1 increases.

In addition, in order to set the accelerating characteristic according to the command SPI, power output from the engine 8 may be increased or decreased, and this control is configured so that a correction driving force is input in the above block B1 and then the required driving force determined on the basis of the above described basic configuration is increased or decreased by the correction driving force. Note that it is only necessary that the correction driving force is determined on the basis of the above described command SPI. For example, it may be only necessary that the relationship between a command SPI and a correction driving force is defined by an experiment or a simulation and then the relationship may be prepared as data in form of a map, or the like, in advance and then the correction driving force may be obtained from the command SPI obtained during running and the data of the correction driving force map, or the like.

FIG. 11 shows an example in which a gear and a required driving force are obtained in parallel with each other from a vehicle speed and an accelerator operation amount. As described above, the speed ratio of the step-gear transmission is controlled on the basis of a vehicle speed and an accelerator operation amount by referring to a shift line map that defines gears or upshift and downshift lines. Thus, the gear is computed from a vehicle speed and an accelerator operation amount on one hand (block B11), and a required driving force is computed from the vehicle speed and the accelerator operation amount on the other hand (block B12). This computation of a required driving force is similar to the above described computation in the block B1 shown in FIG. 11.

The required gear determined in block B11 is transmitted to the shift control device (ECT) B13, and then shift control is executed in the transmission 13. Note that, when a lock-up clutch (LU) is provided in a power transmission path of the vehicle 1, it is determined whether to engage or release the lock-up clutch on the basis of a map prepared in advance, and a command signal for controlling the engagement or release of the lock-up clutch is also output.

On the other hand, the required engine torque is computed on the basis of the required driving force determined in the block B12 and an actual gear of the transmission 13 (block B14), and then the engine (ENG) 8 is controlled so as to generate the thus obtained required engine torque (block B15). The control in the block B14 is similar to the control in the block B4 shown in FIG. 11, and the control in the block B15 is similar to the control in the block B5 shown in FIG. 11.

Figure 12:
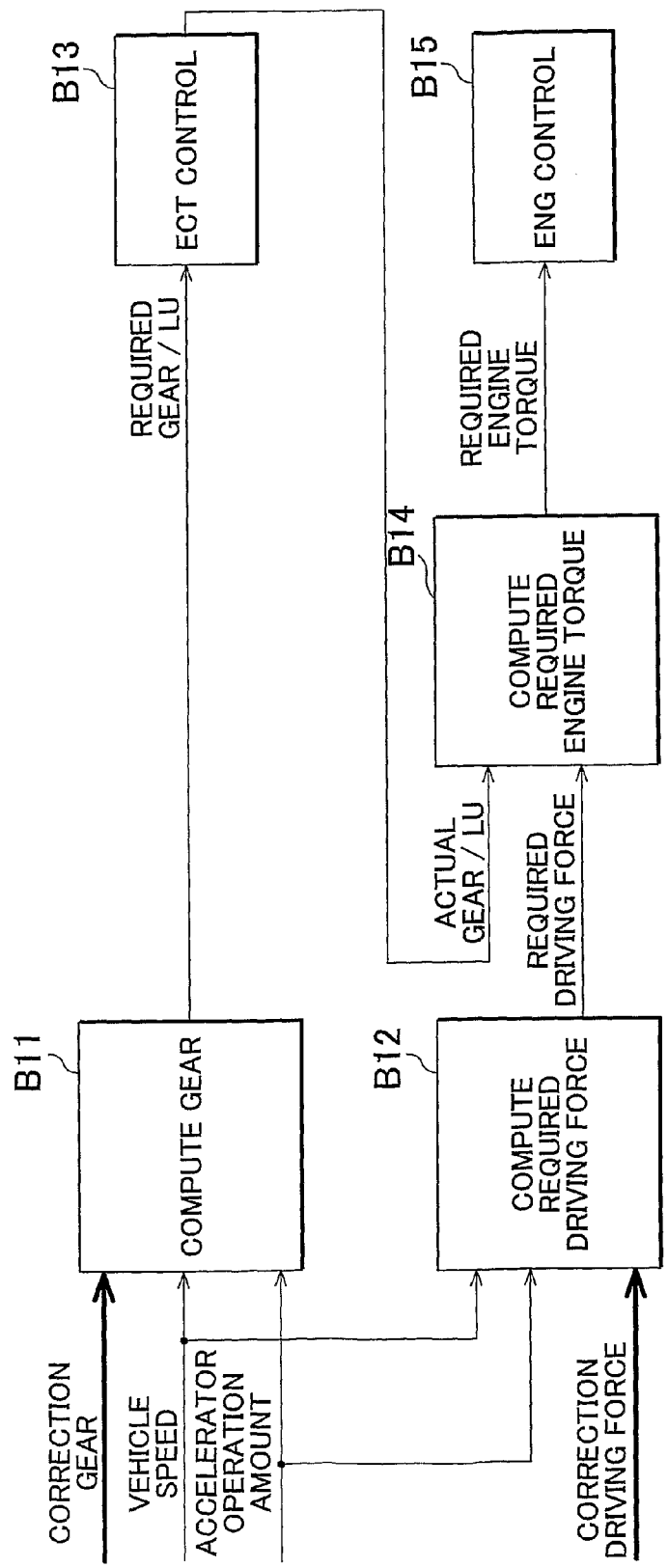
FIG. 12 is a block diagram of other control that incorporates a correction gear and a correction driving force that are obtained on the basis of a command SPI into shift control and engine output control in a vehicle equipped with a step-gear automatic transmission.

In the case of the configuration shown in FIG. 12 as well, when a final command gear based on the command SPI is a further lower vehicle speed side gear, the gear is acquired in the block B11 and is then set as the required gear. As a result, a relatively high speed ratio is set, so the accelerating characteristic serving as the running characteristic of the vehicle 1 increases. In addition, a correction driving force according to the command SPI is input in the block B12, and the required driving force determined by the above described basic configuration is increased or decreased by the correction driving force.

Figure 13:
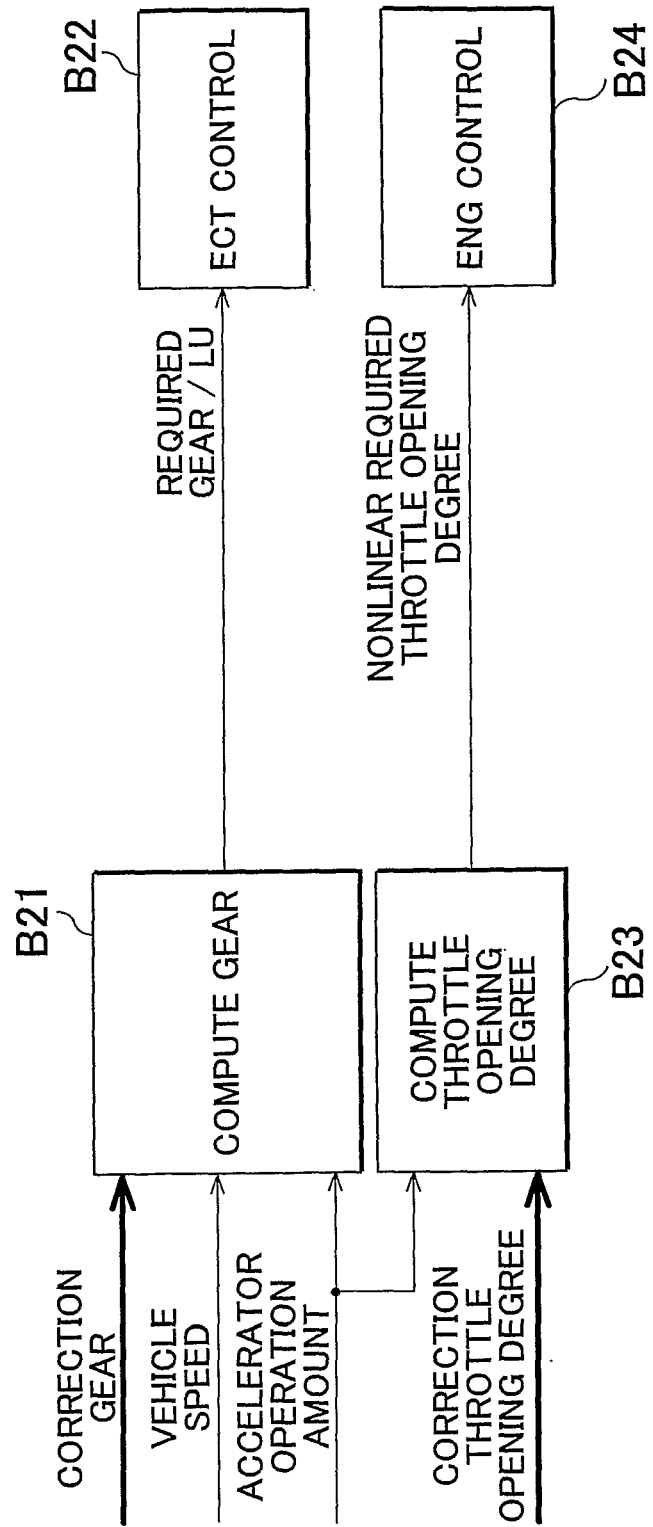
FIG. 13 is a block diagram of further other control that incorporates a correction gear and a correction driving force that are obtained on the basis of a command SPI into shift control and engine output control in a vehicle equipped with a step-gear automatic transmission.

FIG. 13 shows an example in which the transmission 13 and the engine 8 are independently controlled on the basis of a vehicle speed and an accelerator operation amount. That is, a gear is computed on the basis of a vehicle speed and an accelerator operation amount (block B21), the computed required gear is transmitted to the shift control device (ECT) B22, and then shift control is executed in the transmission 13. These controls are similar to the controls in the block B11 and the block B13 shown in FIG. 12.

On the other hand, a throttle opening degree is computed on the basis of an accelerator operation amount (block B23), and the engine 8 is controlled in accordance with the required throttle opening degree (block B24). Note that, when an electronic throttle valve is provided, the relationship between an accelerator operation amount and a required throttle opening degree is generally nonlinear. In a state where the accelerator operation amount is relatively small, a variation in throttle opening degree is small with respect to a variation in accelerator operation amount; whereas, when the accelerator operation amount is relatively large, the relationship between a variation in accelerator operation amount and a variation in throttle opening degree is close to a one-to-one relationship.

In the case of the configuration shown in FIG. 13 as well, when a final command gear based on the command SPI is a further lower vehicle speed side gear, the gear is acquired in the block B21 and is then set as the required gear. As a result, a relatively high speed ratio is set, so the accelerating characteristic serving as the running characteristic of the vehicle 1 increases. In addition, a correction throttle opening degree corresponding to the command SPI is input to the block B23, and the required throttle opening degree determined on the basis of the above described basic configuration is increased or decreased by the correction throttle opening degree. Namely, when the command SPI becomes large, the output characteristic of the driving source relative to the accelerating operation may be changed (for example, the output characteristic may be increased).

As described above, in the control system according to the embodiment of the invention, as the composite acceleration increases on the basis of an intention of acceleration/deceleration, turning, or the like, such as when the accelerator pedal 12 is depressed for acceleration, when the brake pedal 7 is depressed for deceleration, when the steering wheel 16 is rotated for turning, or the like, the command SPI immediately increases in accordance with an increase in the composite acceleration. As a result, excess driving force increases in accordance with the increase of the command SPI, and the required acceleration is generated instantaneously, thus enabling the vehicle to offer a sporty ride as a running characteristic. Then, the above operation is usually conducted by the driver in order to cause the vehicle to run in accordance with a running environment, such as the gradient of a running road, so, eventually, a driving orientation or a running environment is incorporated in the changed running characteristic.

For example, when the vehicle 1 runs onto an uphill, the vehicle 1 travels in a direction opposite to the direction in which the gravitational acceleration is exerted, so the longitudinal acceleration sensor 25 outputs a value larger than a value corresponding to an actual acceleration. Therefore, when the vehicle accelerates on an uphill, the instantaneous SPI increases in comparison with the case where the vehicle 1 runs on a flat road with no inclination. Accordingly, the command SPI increases, so the accelerating characteristic of the vehicle 1 is changed to increase an accelerating force. Therefore, on an uphill, a relatively large driving force may be obtained. In contrast, on a downhill, the longitudinal acceleration sensor 25 outputs a value smaller than a value corresponding to an actual acceleration, so the instantaneous SPI becomes relatively small when the vehicle decelerates on a downhill. However, when braking operation is conducted to suppress an increase in vehicle speed on a downhill, the gravitational acceleration is added to the acceleration associated with the braking operation, so the value output from the longitudinal acceleration sensor 25 is relatively large and, as a result, the instantaneous SPI increases and the accelerating characteristic is changed to increase the maximum accelerating force. Thus, a relatively large engine brake force may be obtained. Hence, an exclusive accelerating/decelerating operation for uphill running and downhill running is not required or relieved, so drivability further improves. In addition, so-called uphill/downhill control, such as generally known control for prohibiting or limiting a high vehicle speed side speed ratio, may be alleviated or not required.

In addition, in the control system according to the embodiment of the invention, when the running characteristic of the vehicle 1 is changed on the basis of accelerations in multiple directions, the degree of a generated acceleration, the magnitude of the acceleration, a driving feel experienced by the driver or the influence on the behavior may vary depending on the direction of the acceleration. Then, in the control system according to the embodiment of the invention, in consideration of the above, the degree of change in running characteristic based on an acceleration in a predetermined direction (in other words, the way of incorporation into the running characteristic) is varied from an acceleration in another direction, so it is possible to further adequately change the running characteristic on the basis of the accelerations in multiple directions.

Note that, in the above specific example, when the vehicle 1 starts running, an acceleration in any of longitudinal and lateral directions occurs, and the command SPI increases accordingly. In contrast, decreasing the command SPI is relatively delayed, so the command SPI and the required maximum acceleration rate associated with the command SPI can be increased in accordance with a period of time elapsed after a start of running and a running distance. Thus, it is possible to increase a so-called sportiness.

In addition, the factor that influences the running characteristic of the vehicle 1 and that determines the running characteristic is not only the above described accelerating characteristic through control over the speed ratio but also the output characteristic of engine torque against accelerator operation, steering characteristic that is the relationship of a turning angle of the front wheels 2 with respect to a steering angle or steering force, the damping characteristic of vibrations or spring constant of each suspension device 4, the turning characteristic based on a torque distribution ratio between the front wheels and the rear wheels in a four wheel drive vehicle, and the like. The control system according to the embodiment of the invention may be configured to change these characteristics on the basis of an index determined from accelerations. For example, in accordance with the above-described command SPI, the output response of the engine 8 is made appropriate, namely, the rate of increase of the throttle opening is made appropriate, the assist torque provided by the assist mechanism 18 is made appropriate, thus making the driver feel appropriately directly about steering, the gear ratio of the steering mechanism 15 is made appropriate, and the turning ability is made appropriate by making the amount of torque distributed to the rear wheels appropriate. The control for changing each characteristic can be implemented by changing the output characteristics of the actuators provided in the respective mechanisms.

Figure 14:
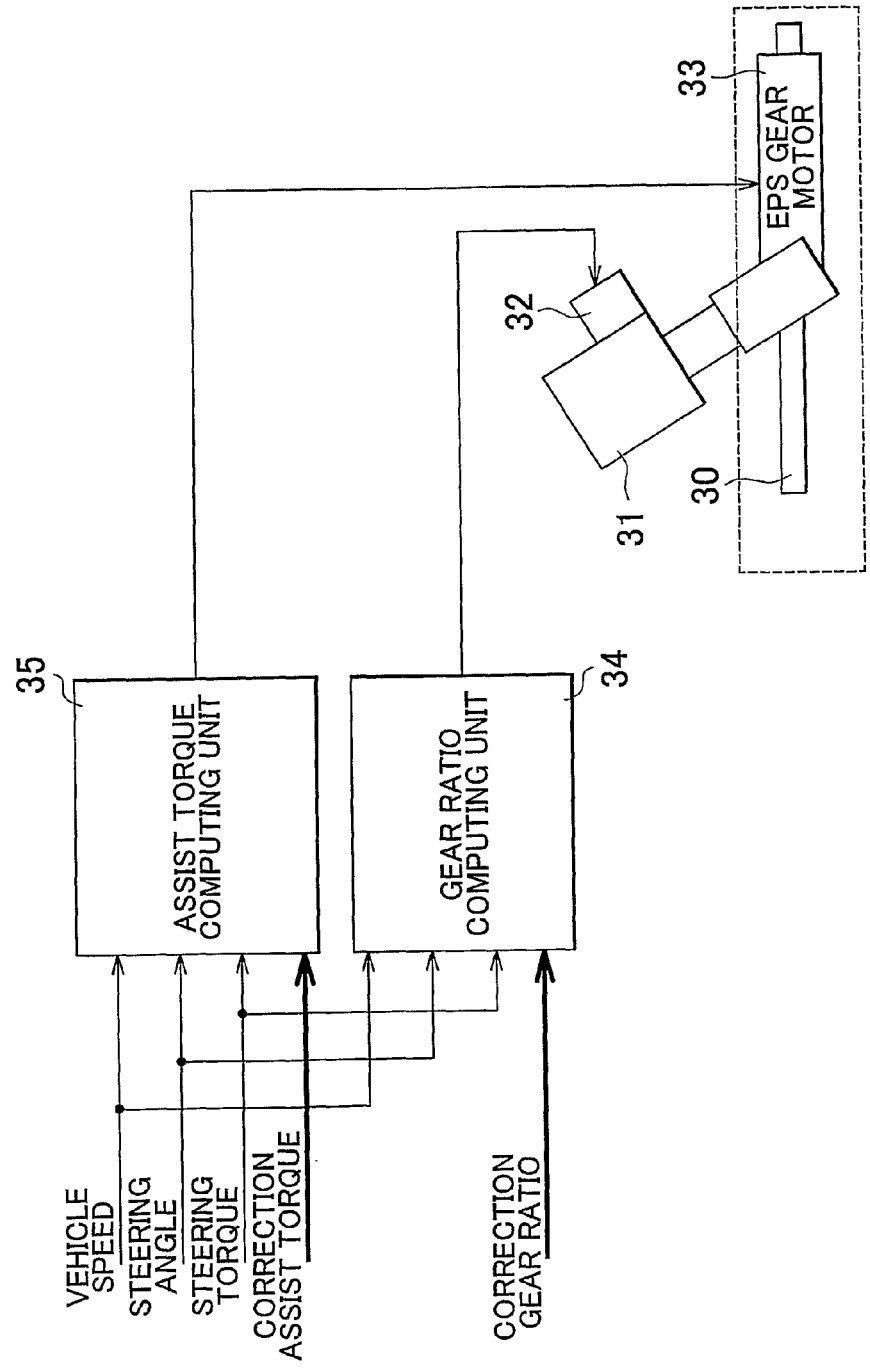
FIG. 14 is a block diagram of control that incorporates a correction gear ratio and a correction assist torque that are obtained on the basis of a command SPI into a steering characteristic.

Furthermore, the control system according to the embodiment of the invention may also be used when the steering characteristic, the suspension characteristic, or the like, which is one of the running characteristic of the vehicle 1, other than when the accelerating characteristic or power characteristic of the vehicle 1 is changed. FIG. 14 is a block diagram for illustrating control for changing the steering characteristic on the basis of the above described SPI, and, for example, schematically shows an electric power steering mechanism (EPS) that uses a variable gear ratio steering gear (VGRS gear). A rack 30 is provided to receive steering force to thereby move back and forth in the transverse direction (lateral direction) of the vehicle 1. The rack 30 is in mesh with the gear of a VGRS gear unit 31. A VGRS actuator 32 for changing the gear ratio is assembled to the VGRS gear unit 31. In addition, an EPS gear motor 33 is provided to assist movement of the rack 30 in a steered direction. Furthermore, a gear ratio computing unit 34 and an assist torque computing unit 35 are provided. The gear ratio computing unit 34 outputs a command signal to the VGRS actuator 32 to change the gear ratio between the rack 30 and the VGRS gear unit 31. The assist torque computing unit 35 computes a torque to be output from the EPS gear motor 33 (thrust force applied to the rack 30) and then outputs the torque as a command signal. These transmission power steering mechanism and computing units may be the ones having generally known configurations.

The detected vehicle speed, the detected steering angle and the detected steering torque are input as data in the above computing units 34 and 35. These data may be acquired from various sensors provided in correspondence with the vehicle speed, steering angle and steering torque. In addition to this, a correction gear ratio is input as data to the gear ratio computing unit 34. The correction gear ratio is used to correct a command signal to the VGRS actuator 32, and is configured to set the command signal to a value corresponding to the command SPI. Specifically, it is only necessary that a map that defines a correction gear ratio in correspondence with a command SPI is prepared in advance and a correction gear ratio is obtained from the map. The relationship between a command SPI and a correction gear ratio may be appropriately defined where necessary.

On the other hand, a correction assist torque is input as data in the assist torque computing unit 35 in addition to the vehicle speed, steering angle and steering torque. The correction assist torque is used to correct a command signal to the EPS gear motor 33 and is configured to set the command signal to a value corresponding to the command SPI. Specifically, it is only necessary that a map that defines a correction assist torque corresponding to a command SPI is prepared in advance, and an assist torque is obtained from the map. The relationship between a command SPI and a correction assist torque may be appropriately defined where necessary.

Thus, in the case of the configuration shown in FIG. 14, the gear ratio in the VGRS unit 31 is changed in accordance with the command SPI obtained on the basis of accelerations occurring in the vehicle 1, and a torque that assists steering force is changed.

In addition, FIG. 15 shows an example of control for changing the suspension characteristic on the basis of the above described command SPI, and an example that is configured to control the vehicle height, damping coefficient of vibrations and spring constant by a variable suspension mechanism (not shown). In FIG. 15, a computing unit 40 is provided to compute required values of these vehicle height, damping coefficient of vibrations and spring constant. The computing unit 40 is, for example, mainly formed of a microcomputer. The computing unit 40 is configured to compute using input data and prestored data to obtain a required vehicle height, a required damping coefficient and a required spring constant. For example, a vehicle speed, a signal detected by a front right (FR) wheel height control sensor, a signal detected by a front left (FL) wheel height control sensor, a signal detected by a rear right (RR) wheel height control sensor, a signal detected by a rear left (RL) wheel height control sensor, a signal detected by a front right (FR) wheel vertical G (acceleration) sensor, a signal detected by a front left (FL) wheel vertical G (acceleration) sensor, a signal detected by a rear right (RR) wheel vertical G (acceleration) sensor, a signal detected by a rear left (RL) wheel vertical G (acceleration) sensor, and the like, are input as the data. These are similar to those of the generally known system.

Then, in the example shown in FIG. 15, a correction vehicle height, a correction damping coefficient and a correction spring constant are input as data for controlling the suspension characteristic. The correction vehicle height is data for correcting the vehicle height in accordance with the above described command SPI. For example, a map that defines a correction vehicle height in correspondence with a command SPI is prepared in advance, and then a correction vehicle height may be obtained from the map.

In addition, the correction damping coefficient is data for correcting damping coefficients in devices and mechanisms that provide vibration damping function, such as the shock absorbers. For example, a map that defines a correction damping coefficient in correspondence with a command SPI is prepared in advance, and a correction damping coefficient may be obtained from the map.

Similarly, the correction spring constant is data for correcting the spring constant in each suspension device 4. For example, a map that defines a correction spring constant in correspondence with a command SPI is prepared in advance, and a correction spring constant may be obtained from the map.

The computing unit 40 is configured to compute using the above described pieces of data, output the calculated required vehicle height to a vehicle height control unit 41 as a control command signal and then control the vehicle height so as to correspond to the command SPI. Specifically, when the command SPI is relatively large, the vehicle height is controlled to be relatively low. In addition, the computing unit 40 is configured to output the computed required damping coefficient to a damping coefficient control unit 42 as a control command signal and then control the damping coefficient so as to correspond to the command SPI. Specifically, when the command SPI is relatively large, the damping coefficient is controlled so as to be relatively large. Furthermore, the computing unit 40 is configured to output the computed required spring constant to a spring constant control unit 43 as a control command signal and then control the spring constant so as to correspond to the command SPI. Specifically, when the command SPI is relatively large, the spring constant is controlled so as to be relatively large.

In this way, the control system according to the embodiment of the invention is able to change the suspension characteristic, which is one example of the running characteristic, in accordance with a control index, such as a command SPI obtained on the basis of an instantaneous acceleration (particularly, a longitudinal acceleration Gx and a lateral acceleration Gy) and to set the suspension characteristic suitable for the running condition of the vehicle 1. As a result, in the case of so-called smooth running in which longitudinal and/or lateral accelerations are relatively small, the suspension characteristic becomes a so-called soft characteristic to improve a ride comfort; whereas, in the case where so-called quick running in which longitudinal and/or lateral accelerations are relatively large is required, the suspension characteristic becomes a so-called stiff characteristic to thereby improve drivability.

As described above, the control system according to the embodiment of the invention is able to change the running characteristic of the vehicle 1 by adequately incorporating a running environment and a driving orientation, and is able to improve the drivability of the vehicle 1 accordingly. On the other hand, in order to incorporate a running environment and a driving orientation into behavior control over the vehicle 1 as described above, when a driving orientation is estimated on the basis of the composite acceleration of the vehicle 1, for example, if the composite acceleration of the vehicle 1 instantaneously or temporarily varies because of unintentional driving operation conducted by the driver, running on a big bumpy bad road or a steep gradient hill, or the like, the variation in composite acceleration may be incorporated as a so-called noise component. As a result, there is a possibility that it is difficult to accurately estimate a driving orientation that meets driver's intention, that is, to appropriately set the above described command SPI. Then, when the control system according to the embodiment of the invention obtains an instantaneous SPI for setting a command SPI, particularly, in order to remove a noise component due to unintentional driving operation of the driver, the control system filters an acceleration detected by a sensor or a computed value normalized from a value detected by a sensor, and then calculates an instantaneous SPI on the basis of the filtered composite acceleration.

Specifically, as shown by the block diagrams in FIG. 1 and FIG. 2, first, a reference acceleration $Gx_{acc}$ is calculated as a so-called static longitudinal acceleration that is a reference for filtering, which will be described later, on the basis of an operation amount of the accelerator pedal 12 (accelerator operation amount) (block B31). Similarly, a reference deceleration $Gx_{dec}$ is calculated as a so-called static longitudinal deceleration (that is, a negative acceleration) that is a reference for filtering, which will be described later, on the basis of an operation amount of the brake pedal 7 (brake operation amount) (block B32).

Note that at least one of the reference acceleration $Gx_{acc}$ and the reference deceleration $Gx_{dec}$ that are calculated here is desirably subjected to the above described normalization and is then used. That is, as described above, in a general vehicle, a decelerating acceleration (that is, deceleration) is larger than an accelerating acceleration. Thus, here, the reference acceleration $Gx_{acc}$ is subjected to normalization so that the value is corrected to increase.

The calculated reference acceleration $Gx_{acc}$ and reference deceleration $Gx_{dec}$ each are subjected to filtering. That is, for the reference acceleration $Gx_{acc}$, for example, filtering is performed using the low-pass filter expressed by the following transfer function (block B33).

$$f(s)=1/(1+s\times T_{21})$$

Figure 4:
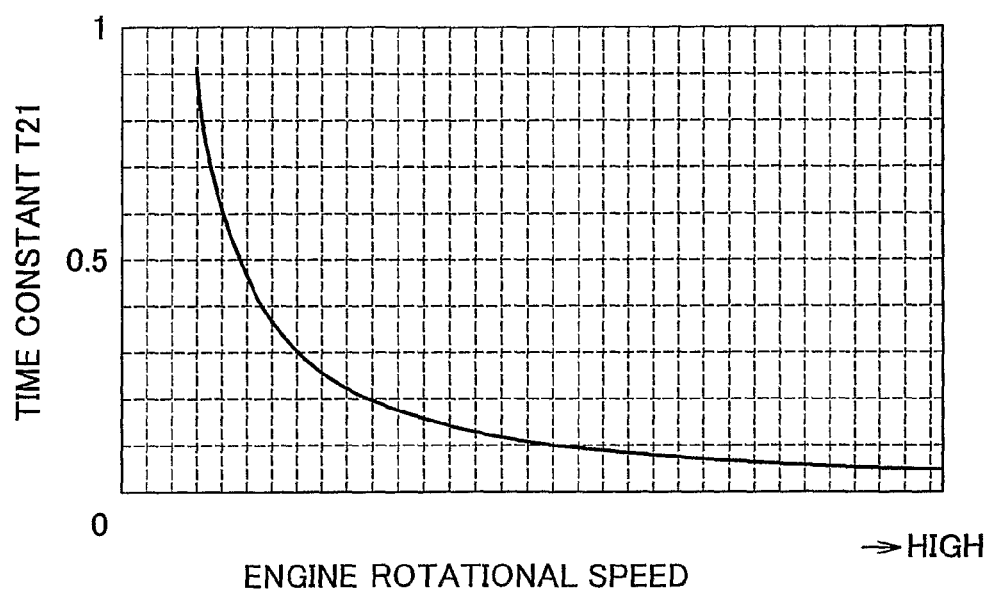
FIG. 4 is an example of a map used when a time constant of a transfer function is set in the filtering shown in the block diagram of FIG. 1.

Here, $T_{21}$ is a predetermined time constant in consideration of the response characteristic of the engine 8, such as a delay in response of the engine 8 to driver's accelerator operation, and may also be obtained from a map that indicates the time constant $T_{21}$ set in correspondence with the rotational speed of the engine 8 as shown in FIG. 4, for example.

In addition, for the reference deceleration $Gx_{dec}$, for example, filtering is performed using the low-pass filter expressed by the following transfer function (block B34).

$$f(s)=1/(1+s\times T_{22})$$

Here, $T_{22}$ is a predetermined time constant in consideration of the response characteristic of the brake device, such as a delay in response of the brake devices to driver's brake pedal operation.

As described above, when steep accelerator operation or brake operation is conducted by the driver, a large fluctuating component, that is, a noise that is a relatively high-frequency fluctuating component, instantaneously or temporarily occurs in the reference acceleration $Gx_{acc}$ and the reference deceleration $Gx_{dec}$. In contrast, as described above, when the reference acceleration $Gx_{acc}$ and the reference deceleration $Gx_{dec}$ are subjected to filtering using a low-pass filter (in other words, high-cut filter), a high-frequency noise component in the longitudinal acceleration, arising from driver's rough accelerator operation, brake operation, or the like, may be removed.

Then, a tentative target value Gx* of the longitudinal acceleration is calculated from the acceleration and deceleration filtered as described above (block B35). That is, as expressed by the following mathematical expression, the filtered value of the reference deceleration $Gx_{dec}$ is subtracted from the filtered value of the reference acceleration $Gx_{acc}$ to calculate the tentative target value Gx* of the longitudinal acceleration.

$$Gx^*=Gx_{acc}-Gx_{dec}$$

On the other hand, a reference lateral acceleration $Gy_{yaw}$ is calculated as a so-called static lateral acceleration that is a reference for filtering on the basis of the steering angle of the steering wheel 16 (block B36). The reference lateral acceleration $Gy_{yaw}$ is, for example, calculated by the following mathematical expression.

$$Gy_{yaw}=G_\delta^r(0)\times(1+T_r\times s)/(1+2\times \zeta\times s/\omega_n+s^2/\omega_n) \quad (2)$$

In the above mathematical expression (2), $\omega_n$ is a natural frequency in a secondary oscillation system of the vehicle 1, $\zeta$ is a damping coefficient, $G_\delta^r(0)$ is a frequency transfer function, $T_r$ is a time constant. Here, where the inertial mass of the vehicle 1 is in, the yaw inertia radius is k, the vehicle speed is V, the wheel base is 1, the distance between the barycenter of the vehicle and the front wheel axle is $l_f$, the distance between the barycenter of the vehicle and the rear wheel axle is $l_r$, the cornering power of the front wheels 2 is $K_f$, the cornering power of the rear wheels 3 is $K_r$, and the stability factor that indicates the control stability of the vehicle 1 is A, the above natural frequency ωn is expressed by the following mathematical expression.

$$\omega_n=\{2\times(K_f+K_r)/(m\times V)\}\times(l_f\times l_r/k^2)^{1/2}\times(1+A\times V^2)^{1/2}$$

The damping coefficient $\zeta$ is expressed by the following mathematical expression.

$$\zeta=\{1+k^2/(l_f\times l_r)\}/[2\times\{k^2/(l_f\times l_r)\}^{1/2}\times(1+A\times V^2)^{1/2}]$$

The frequency transfer function $G_\delta^r(0)$ is expressed by the following mathematical expression.

$$G_\delta^r(0)=\{1/(1+A\times V^2)\}\times V/1$$

The time constant $T_r$ is expressed by the following mathematical expression.

$$T_r=m\times l_f\times V/(2\times 1\times K_r)$$

Then, the reference lateral acceleration $Gy_{yaw}$ calculated by the above mathematical expression (2) is, for example, subjected to filtering using the low-pass filter expressed by the following transfer function (block B37).

$$f(s)=1/(1+s\times T_{23})$$

Then, the filtered lateral acceleration is set as a tentative target value Gy* of the lateral acceleration. Here, $T_{23}$ is a predetermined time constant in consideration of the response characteristic of the steering device 15, such as a delay in response of the steering device 15 to driver's steering operation.

As in the case of the above described reference acceleration $Gx_{acc}$ and reference deceleration $Gx_{dec}$, when steep steering operation is conducted by the driver, a large fluctuating component, that is, a noise that is a relatively high-frequency fluctuating component, instantaneously or temporarily occurs in the reference lateral acceleration $Gy_{yaw}$. In contrast, as described above, when the reference lateral acceleration $Gy_{yaw}$ is subjected to filtering using a low-pass filter (in other words, high-cut filter), a high-frequency noise component in the lateral acceleration, arising from driver's unintentional steering operation, or the like, may be removed.

In this way, when the tentative target value Gx* of the longitudinal acceleration and the tentative target value Gy* of the lateral acceleration are obtained, the tentative target value Gx* of the longitudinal acceleration and the tentative target value Gy* of the lateral acceleration each are further subjected to filtering to obtain a target value Gx*$_{filt}$ of the longitudinal acceleration and a target value Gy*$_{filt}$ of the lateral acceleration.

That is, subsequently, as shown in FIG. 2, the target value Gx*$_{filt}$ of the longitudinal acceleration is further subjected to filtering using the low-pass filter expressed by the following transfer function (block B38).

$$f(s)=1/(1+s\times T_{24})$$

The filtered longitudinal acceleration is set as the target value Gx*$_{filt}$ of the longitudinal acceleration. Here, $T_{24}$ is a predetermined time constant in consideration of a pitching resonant frequency to the behavior of the vehicle 1 in the pitching direction.

On the other hand, the tentative target value Gy* of the lateral acceleration is further subjected to filtering using the low-pass filter expressed by the following transfer function (block B39).

$$f(s)=1/(1+s \times T_{25})$$

The filtered lateral acceleration is set as the target value Gy*$_{filt}$ of the lateral acceleration. Here, $T_{25}$ is a time constant in consideration of a rolling resonant frequency to the behavior of the vehicle 1 in the rolling direction.

The vehicle 1 has a unique resonant frequency in the pitching direction and a unique resonant frequency in the rolling direction in accordance with the vehicle body stiffness of the vehicle 1, the damping characteristic of each suspension device 4, the response characteristic of the steering device 15, or the like. As described above, when the vehicle runs in a sporty mode, the characteristic of each suspension device 4 is set to be stiff, and the response of the steering device 15 is increased. Therefore, for example, when accelerator operation, brake operation or steering operation is unintentionally conducted by the driver, resonant in the pitching direction or the rolling direction arises in a relatively high-frequency band in the longitudinal acceleration or lateral acceleration of the vehicle 1 as a noise component. In contrast, as described above, when the tentative target values Gx* and Gy* of the longitudinal and lateral accelerations are subjected to filtering using a low-pass filter (in other words, high-cut filter) in consideration of a pitching resonant frequency and a rolling resonant frequency, a high-frequency noise component may be removed during running in a sporty mode.

Then, an instantaneous SPI according to the embodiment of the invention is calculated from the target value Gx*$_{filt}$ of the longitudinal acceleration and the target value Gy*$_{filt}$ of the lateral acceleration obtained as described above (block B40). Specifically, by substituting the target value Gx*$_{filt}$ of the longitudinal acceleration and the target value Gy*$_{filt}$ of the lateral acceleration into the longitudinal acceleration Gx and the lateral acceleration Gy in the above described mathematical expression (1), the instantaneous SPI may be obtained. That is, the instantaneous SPI is calculated as follows.

$$\text{instantaneous } SPI=(Gx^{*}{}_{filt}{}^{2}+Gy^{*}{}_{filt}{}^{2})^{1/2} \qquad (3)$$

After that, as in the case of the above described procedure, a command SPI according to the embodiment of the invention is obtained on the basis of the instantaneous SPI calculated from the target values Gx*$_{filt}$ and Gy*$_{filt}$ of the respective accelerations from which noise components are removed through the above described filtering.

Next, removal of a noise component as measures for the case where a variation in acceleration is incorporated as a noise component through an instantaneous or temporary variation in acceleration of the vehicle 1 caused by a change of a road surface condition on which the vehicle 1 is running will be described. As described above, the control system according to the embodiment of the invention is able to change the running characteristic of the vehicle 1 by adequately incorporating a running environment or a driving orientation, and is able to improve drivability of the vehicle 1 accordingly. On the other hand, in order to incorporate a running environment or a driving orientation into behavior control over the vehicle 1 as described above, when a driving orientation is estimated on the basis of the acceleration of the vehicle 1, for example, if the acceleration of the vehicle 1 instantaneously or temporarily varies because of running on a big bumpy bad road or a steep gradient hill, or the like, the variation in acceleration may be incorporated as a so-called noise component. As a result, there is a possibility that it is difficult to accurately estimate a driving orientation that meets driver's intention, that is, to appropriately set the above described command SPI. Then, when the control system described below obtains an instantaneous SPI for setting a command SPI, particularly, in order to remove a noise component generated because of a change of a road surface condition during running, the control system is configured to filter a vehicle parameter that indicates a motion of the vehicle 1, such as an acceleration obtained from output values of the acceleration sensors 25 and 26 and the wheel speed sensor 19 using a band-pass filter that removes a noise in a specific frequency band and to calculate the instantaneous SPI on the basis of the filtered vehicle parameter.

Figure 3:
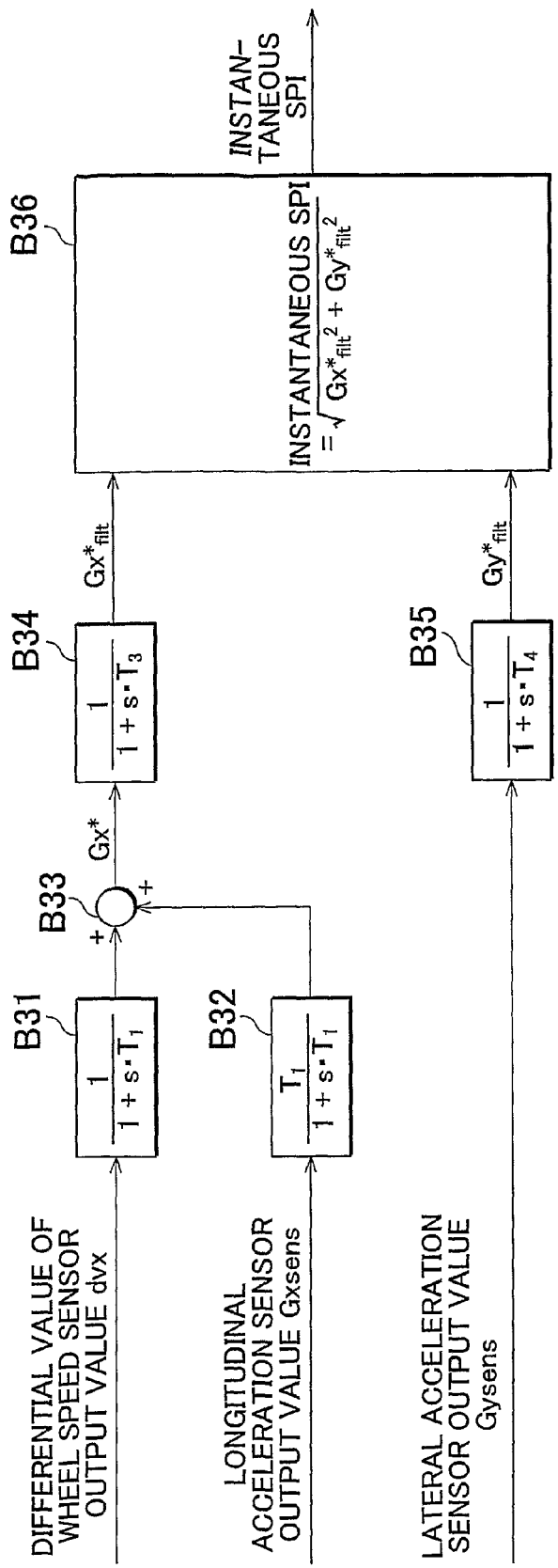
FIG. 3 is a block diagram that shows another procedure by which accelerations detected in order to obtain a command SPI are filtered by the noise reduction unit according to the embodiment of the invention.

Specifically, as shown by the block diagram of FIG. 3, first, a differential value dvx of the output value of the wheel speed sensor 19 is computed, and then the differential value dvx is subjected to filtering (block B31). Specifically, the differential value dvx is, for example, subjected to filtering using the low-pass filter expressed by the following transfer function.

$$f(s)=1/(1+s \times T_1)$$

Here, $T_1$ is a predetermined time constant in consideration of, for example, a power transmission characteristic, or the like, in a drive train from the output shaft of the engine 8 to the rear wheels 3, shown in FIG. 16.

In addition, the output value Gxsens of the longitudinal acceleration sensor 25 is obtained, and then the output value Gxsens is subjected to filtering (block B32). Specifically, the output value Gxsens of the longitudinal acceleration sensor 25 is, for example, subjected to filtering using a high-pass filter expressed by the following transfer function.

$$f(s)=T_1/(1+s \times T_1)$$

As described above, the vehicle 1 is equipped with the longitudinal acceleration sensor 25, and the longitudinal acceleration of the vehicle 1 may be obtained form the output value of the longitudinal acceleration sensor 25. When the vehicle 1 runs on an uphill, a low-frequency fluctuating component of the longitudinal acceleration occurs in comparison with the case where the vehicle 1 runs on a flat road.

Thus, when the output value of the longitudinal acceleration sensor 25 is directly employed as the longitudinal acceleration of the vehicle 1, as in the case of the above, a low-frequency fluctuating component of the longitudinal acceleration, which is usually not expected, may occur as a noise component depending on the gradient of a road surface on which the vehicle 1 runs. For such a fluctuating component, the output value Gxsens of the longitudinal acceleration sensor 25 is subjected to a high-pass filter (in other words, low-cut filter) to thereby make it possible to remove a specific low-frequency band fluctuating component of the output value Gxsens as a noise. Note that a specific low-frequency band from which a noise is removed by the high-pass filter may be, for example, appropriately set in accordance with the magnitude of road surface gradient detected by the inclination angle sensor 36.

The tentative target value Gx* of the longitudinal acceleration is calculated from the thus filtered differential value dvx of the output value of the wheel speed sensor 19 and the thus filtered output value Gxsens of the longitudinal acceleration sensor 25 (block B33). That is, as expressed by the following mathematical expression, the tentative target value Gx* of the longitudinal acceleration is calculated by adding the filtered value dvx* of the differential value dvx of the output value of the wheel speed sensor 19 and the filtered value Gxsens* of the output value Gxsens of the longitudinal acceleration sensor 25.

$$Gx^* = dvx^* + Gxsens$$

In this way, by adding the filtered value dvx* of the differential value dvx and the filtered value Gxsens* of the output value Gxsens, it is possible to compensate for a gain and a deviation in phase between dvx and Gxsens.

Then, the tentative target value Gx* of the longitudinal acceleration calculated as described above is further subjected to filtering (block B34). Specifically, the tentative target value Gx* of the longitudinal acceleration is, for example, subjected to filtering using the low-pass filter expressed by the following transfer function.

$$f(s) = 1/(1 + s \times T_3)$$

The filtered longitudinal acceleration is set as a target value $Gx^*_{filt}$ of the longitudinal acceleration. Here, $T_3$ is a predetermined time constant in consideration of a noise due to irregularities of a running road surface and a noise included in the output value Gxsens of the longitudinal acceleration sensor 25.

That is, as described above, when the irregularities of a road surface on which the vehicle 1 runs are large, the acceleration of the vehicle 1 instantaneously or temporarily fluctuates, and the fluctuating component may be incorporated as a high-frequency noise component. In addition, a noise component inevitably included because of the configuration of a sensor may be incorporated in the output value Gxsens of the longitudinal acceleration sensor 25. In contrast, when the tentative target value Gx* of the longitudinal acceleration calculated from the filtered value dvx* of the differential value dvx and the filtered value Gxsens* of the output value Gxsens as described above is further subjected to a low-pass filter (in other words, high-cut filter), a specific high-frequency band fluctuating component of the tentative target value Gx* of the longitudinal acceleration may be removed as a noise.

On the other hand, the output value Gysens of the lateral acceleration sensor 26 is obtained, and then the output value Gysens is subjected to filtering (block B35). Specifically, the output value Gysens of the lateral acceleration sensor 26 is, for example, subjected to filtering using the low-pass filter expressed by the following transfer function.

$$f(s) = 1/(1 + s \times T_4)$$

The filtered lateral acceleration is set as a target value $Gy^*_{filt}$ of the lateral acceleration. Here, $T_4$ is a predetermined time constant in consideration of a noise included in the output value Gysens of the lateral acceleration sensor 26.

That is, as in the case of the above described output value Gxsens of the longitudinal acceleration sensor 25, a high-frequency noise component inevitably included because of the configuration of a sensor may be incorporated in the output value Gysens of the lateral acceleration sensor 26. In contrast, when the output value Gysens of the lateral acceleration sensor 26 is subjected to a low-pass filter (in other words, high-cut filter) as described above, a specific high-frequency band fluctuating component of the output value Gysens of the lateral acceleration sensor 26 may be removed as a noise.

Then, an instantaneous SPI according to the embodiment of the invention is calculated from the target value $Gx^*_{filt}$ of the longitudinal acceleration and the target value $Gy^*_{filt}$ of the lateral acceleration that are obtained as described above (block B36). Specifically, by substituting the target value $Gx^*_{filt}$ of the longitudinal acceleration and the target value $Gy^*_{filt}$ of the lateral acceleration into the longitudinal acceleration Gx and the lateral acceleration Gy in the above described mathematical expression (1), the instantaneous SPI may be obtained. That is, the instantaneous SPI is calculated by the following mathematical expression.

$$\text{instantaneous } SPI = (Gx^{*2}_{filt} + Gy^{*2}_{filt})^{1/2} \tag{4}$$

After that, as in the case of the above described procedure, a command SPI according to the embodiment of the invention is obtained on the basis of the instantaneous SPI calculated from the target values $Gx^*_{filt}$ and $Gy^*_{filt}$ of the respective accelerations from which noise components are removed through the above described filtering.

The above described filtering may be modified into various forms. For example, a filter for a lateral acceleration component of an acceleration component and a filter for a longitudinal acceleration component of the acceleration component may have filter characteristics having the same degree of strength or may have different degrees of strength. Here, the strength of a filter indicates the degree to which a waveform component of an input signal is reduced by processing. As the filter gets strong, an input signal is processed so that the waveform of an output signal approaches a flat shape. For example, the filter characteristic for a lateral acceleration component may be stronger than the filter characteristic for a longitudinal acceleration component. The above configuration effectively functions in a running environment in which a lateral noise component is larger than a longitudinal noise component. In addition, for a longitudinal acceleration component, the filter characteristic of an acceleration component in a braking direction may be stronger than the filter characteristic of an acceleration component in an accelerating direction (positive in a travelling direction). The above configuration effectively functions in a vehicle of which the control response of a brake is more sensitive than the control response of a driving source.

In addition, a filter for acceleration used to generate a command SPI may be a filter shared with another control that uses the acceleration or may be different from another control. For example, an acceleration is also used in other controls, such as an ABS, a traction control (slip suppressing control) and a side slip suppressing control (for example, VSC); however, a command SPI may be generated using an acceleration processed by a second filter having a filter characteristic stronger than the filter characteristic of a first filter used in those controls. Here, when the filter characteristic becomes strong, a delay in response occurs. With the above configuration, it is possible to suitably achieve both a noise reduction function appropriate for a sportiness and a noise reduction function, response, and the like, required for other controls. Note that, to generate a command SPI, the first filter may be used for processing prior to processing using the second filter.

In addition, the same filter may be used irrespective of a speed, or a filter having a different filter characteristic may be used in accordance with a speed range.

For example, the filter characteristic may be stronger as the speed approaches a low speed range. With the above configuration, suitable control is possible in a start and low speed range in which the influence of rough driving or a road surface tends to be remarkable.

As described above, with the control system according to the embodiment of the invention, the command SPI obtained as an index that indicates the running condition of the vehicle 1 is varied at a relatively higher rate in a direction to increase the accelerating characteristic of the vehicle 1 than in a direction to decrease the accelerating characteristic of the vehicle 1. As a result, it may be adequately incorporated into behavior control over the vehicle 1 using the command SPI.

In addition, with the control system according to the embodiment of the invention, the above command SPI is obtained on the basis of the vehicle parameter of the vehicle 1, such as accelerations of the vehicle 1 in multiple directions, specifically, the longitudinal acceleration and lateral acceleration of the vehicle 1, and the command SPI is incorporated into behavior control over the vehicle 1. More specifically, the operating state or operating characteristic of an actuator that controls the output of the engine 8, an actuator that executes shift control of the transmission 13, an actuator that controls the operation of each suspension device 4, an actuator that controls the operation of the steering device 15, and the like, are changed on the basis of the longitudinal acceleration and lateral acceleration of the vehicle 1 to thereby change the running characteristic of the vehicle 1.

The vehicle 1 is running while receiving not only a longitudinal acceleration but also a lateral acceleration or an acceleration in a turning direction. Therefore, these accelerations in multiple directions are incorporated into the above command SPI as the vehicle parameter of the vehicle 1. By so doing, the command SPI may further adequately reflect an actual behavior of the vehicle 1. Therefore, it is possible to set the running characteristic into which an actual behavior of the vehicle 1 is further adequately incorporated.

Furthermore, with the control system according to the embodiment of the invention, when a command SPI is obtained on the basis of the vehicle parameter of the vehicle 1, such as the longitudinal acceleration and lateral acceleration of the vehicle 1, fluctuating components of those longitudinal and lateral accelerations are attenuated. Specifically, for example, a temporary or instantaneous large fluctuating component of an acceleration, which occurs because of driver's rough driving operation, such as quick acceleration, quick braking and quick steering, that is, a high-frequency fluctuating component of an acceleration, which becomes a noise, is removed by a low-pass filter. In addition, for example, a temporary or instantaneous large fluctuating component of an acceleration, which occurs because of a change of the condition of a running road surface, such as when the irregularities of a road surface increase and when the vehicle runs from a flat road into a steep gradient hill, that is, a specific frequency band fluctuating component that becomes a noise, is removed by a low-pass filter and/or a high-pass filter. Therefore, it is possible to appropriately suppress the influence of a variation in acceleration on a determination of a command SPI although the influence is not intended by the driver. As a result, an actual behavior of the vehicle 1 may be further adequately incorporated into the command SPI.

Note that the command SPI in the embodiment of the invention is a parameter used when a so-called operating characteristic or running characteristic of the vehicle is changed. For example, the operating characteristic of the vehicle includes a control characteristic, such as the control amount or control speed of an actuator (for example, a motor, an engine, a shift device, brake devices and an electric power steering device) to an operating component (for example, a steering, an accelerator and a brake). In addition, the running characteristic of the vehicle includes the control characteristic of an actuator (for example, an active stabilizer and an active suspension) of a portion in connection with running controlled on the basis of a predetermined command value. In addition, FIG. 6 shows an example in which, when the command SPI is increased, the command SPI is quickly increased to a new maximum value of the instantaneous SPI; instead, the command SPI may be increased in a stepwise manner or increased gently.

In addition, control executed by the above described control system according to the embodiment of the invention may be implemented in combination with the existing art. For example, the existing technique, such as a neurocomputer or a neural network, in the system described in JP-A-06-249007 may be applied to the control technique according to the embodiment of the invention to implement the control according to the embodiment of the invention.

The invention claimed is:

1. A vehicle control system that obtains an index indicating a running condition of a vehicle on the basis of a vehicle parameter indicating a motion of the vehicle and then sets a running characteristic of the vehicle in accordance with the index, comprising:
   a noise reduction unit that is configured to obtain the index on the basis of the vehicle parameter of which a fluctuating component that fluctuates due to a condition of a running road surface is attenuated,
   wherein the noise reduction unit is configured to attenuate a noise component of a predetermined frequency that falls within a predetermined frequency band of the fluctuating component by filtering the fluctuating component using a band-pass filter having a predetermined frequency characteristic, in order to suppress an influence of a noise of the fluctuating component on a resultant index.

2. The vehicle control system according to claim 1, wherein
   the vehicle parameter includes an acceleration of the vehicle.

3. The vehicle control system according to claim 1, wherein
   the noise reduction unit is configured to attenuate a noise component of a predetermined frequency in the fluctuating component.

4. The vehicle control system according to claim 1, wherein
   the filter used in the noise reduction unit is the same filter as that used in a unit other than the noise reduction unit.

5. The vehicle control system according to claim 1, wherein
   the filter used in the noise reduction unit is different from a filter used in a unit other than the noise reduction unit.

6. The vehicle control system according to claim 1, wherein
   in the filter used in the noise reduction unit, a filter characteristic for a component in a longitudinal direction of the vehicle is different from a filter characteristic for a component in a lateral direction of the vehicle.

7. The vehicle control system according to claim 1, wherein
   the filter used in the noise reduction unit has a filter characteristic that is varied in accordance with a speed range of the vehicle.

8. The vehicle control system according to claim 2, wherein
   the noise reduction unit is configured to attenuate a noise component of a predetermined frequency in the fluctuating component.

\* \* \* \* \*